(12) United States Patent
Shulyak et al.

(10) Patent No.: US 12,229,556 B2
(45) Date of Patent: Feb. 18, 2025

(54) PREDICTING A LOAD VALUE FOR A SUBSEQUENT LOAD OPERATION

(71) Applicant: Arm Limited, Cambridge (GB)

(72) Inventors: Alexander Cole Shulyak, Austin, TX (US); Yasuo Ishii, Austin, TX (US); Joseph Michael Pusdesris, Austin, TX (US)

(73) Assignee: Arm Limited, Cambridge (GB)

( * ) Notice: Subject to any disclaimer, the term of this patent is extended or adjusted under 35 U.S.C. 154(b) by 11 days.

(21) Appl. No.: 18/353,345

(22) Filed: Jul. 17, 2023

(65) Prior Publication Data

US 2025/0028531 A1 Jan. 23, 2025

(51) Int. Cl.
*G06F 9/30* (2018.01)
*G06F 13/16* (2006.01)

(52) U.S. Cl.
CPC ........ *G06F 9/30043* (2013.01); *G06F 13/161* (2013.01); *G06F 13/1642* (2013.01)

(58) Field of Classification Search
CPC . G06F 9/30043; G06F 13/161; G06F 13/1642
See application file for complete search history.

(56) References Cited

U.S. PATENT DOCUMENTS

| | | | | |
|---|---|---|---|---|
| 6,119,203 A * | 9/2000 | Snyder | ..................... | G06F 9/383 711/213 |
| 6,266,768 B1 * | 7/2001 | Frederick, Jr. | ........ | G06F 9/3834 712/210 |
| 6,415,380 B1 * | 7/2002 | Sato | ..................... | G06F 9/3832 711/204 |
| 6,938,150 B2 * | 8/2005 | Fukagawa | ............. | G06F 9/3836 712/E9.05 |
| 9,606,805 B1 * | 3/2017 | Alexander | .......... | G06F 9/30058 |
| 10,754,652 B2 * | 8/2020 | Yamamura | ............ | G06F 9/3455 |
| 11,842,192 B2 * | 12/2023 | Takata | ................ | G06F 9/30076 |
| 2014/0281408 A1 * | 9/2014 | Zeng | ..................... | G06F 9/3834 712/216 |
| 2019/0377580 A1 * | 12/2019 | Vorbach | .............. | G06F 9/30123 |

* cited by examiner

*Primary Examiner* — Cheng Yuan Tseng
(74) *Attorney, Agent, or Firm* — NIXON & VANDERHYE P.C.

(57) ABSTRACT

Processing circuitry to execute load operations, each associated with an identifier. Prediction circuitry to receive a given load value associated with a given identifier, and to make, in dependence on the given load value, a prediction indicating a predicted load value for a subsequent load operation to be executed by the processing circuitry and an ID-delta value indicating a difference between the given identifier and an identifier of the subsequent load operation. The predicted load value being predicted in dependence on at least one occurrence of each of the given load value and the predicted load value during execution of a previously-executed sequence of load operations. The prediction circuitry is configured to determine the ID-delta value in dependence on a difference between identifiers associated with the at least one occurrence of each of the given load value and the predicted load value in the previously-executed sequence of load operations.

20 Claims, 15 Drawing Sheets

PREDICTING A LOAD VALUE FOR A SUBSEQUENT LOAD OPERATION

BACKGROUND

The present technique relates to the field of data processing.

Load instructions are instructions which, when executed, cause data values to be fetched from the memory system. For example, a load instruction may specify a memory address identifying a particular memory location, and a data value may be fetched from that memory location (or from a cache entry associated with the memory address) and placed in a register. Load operations can, at times, be associated with a long latency—for example, if the data value to be loaded is not present in data cache and has to be fetched from memory. Load operations are also fairly common. Hence, load operations and their associated latency can have a significant impact on performance.

One way to improve the performance of load operations is to implement a prediction scheme. For example, a load value predictor may be used to predict a data value that will be fetched by an upcoming load operation, with the predicted data value being made available in the same way that the data value would be made available on execution of the load operation. This can improve performance by allowing the data value to be made available sooner.

SUMMARY

Viewed from one example, the present technique provides an apparatus comprising:
processing circuitry to execute load operations, each load operation being associated with an identifier indicative of a position of the load operation in a sequence of load operations; and
prediction circuitry to receive a given load value indicative of a value read in response to execution of a given load operation, the given load operation being associated with a given identifier,
wherein the prediction circuitry is configured to make, in dependence on the given load value, at least one prediction indicating a predicted load value for a subsequent load operation to be executed by the processing circuitry and an ID-delta value indicating a difference between the given identifier and an identifier of the subsequent load operation; and
wherein the prediction circuitry is configured to determine the predicted load value in dependence on at least one occurrence of each of the given load value and the predicted load value being observed during execution of a previously-executed sequence of load operations; and
wherein the prediction circuitry is configured to determine the ID-delta value in dependence on a difference between identifiers associated with the at least one occurrence of each of the given load value and the predicted load value in the previously-executed sequence of load operations.

Viewed from another example, the present technique provides a system comprising:
the apparatus described above, implemented in at least one packaged chip;
at least one system component; and
a board,
wherein the at least one packaged chip and the at least one system component are assembled on the board.

Viewed from another example, the present technique provides a chip-containing product comprising the system described above assembled on a further board with at least one other product component.

Viewed from another example, the present technique provides a method comprising:
executing load operations, each load operation being associated with an identifier indicative of a position of the load operation in a sequence of load operations;
receiving a given load value indicative of a value read in response to execution of a given load operation, the given load operation being associated with a given identifier,
making, in dependence on the given load value, at least one prediction indicating a predicted load value for a subsequent load operation to be executed and an ID-delta value indicating a difference between the given identifier and an identifier of the subsequent load operation;
determining the predicted load value in dependence on at least one occurrence of each of the given load value and the predicted load value being observed during execution of a previously-executed sequence of load operations; and
determining the ID-delta value in dependence on a difference between identifiers associated with the at least one occurrence of each of the given load value and the predicted load value in the previously-executed sequence of load operations.

Viewed from another example, the present technique provides a computer program comprising instructions which, when executed by a computer, cause the computer to perform the method described above. The computer program may be stored on a computer-readable storage medium, which may be transitory or non-transitory.

Viewed from another example, the present technique provides a computer program comprising computer-readable code for fabrication of an apparatus comprising:
processing circuitry to execute load operations, each load operation being associated with an identifier indicative of a position of the load operation in a sequence of load operations; and
prediction circuitry to receive a given load value indicative of a value read in response to execution of a given load operation, the given load operation being associated with a given identifier,
wherein the prediction circuitry is configured to make, in dependence on the given load value, at least one prediction indicating a predicted load value for a subsequent load operation to be executed by the processing circuitry and an ID-delta value indicating a difference between the given identifier and an identifier of the subsequent load operation; and
wherein the prediction circuitry is configured to determine the predicted load value in dependence on at least one occurrence of each of the given load value and the predicted load value being observed during execution of a previously-executed sequence of load operations; and
wherein the prediction circuitry is configured to determine the ID-delta value in dependence on a difference between identifiers associated with the at least one occurrence of each of the given load value and the predicted load value in the previously-executed sequence of load operations. The computer program may be stored on a computer-readable storage medium, which may be transitory or non-transitory.

Further aspects, features and advantages of the present technique will be apparent from the following description of examples, which is to be read in conjunction with the accompanying drawings.

DESCRIPTION OF EXAMPLES

Figure 1:
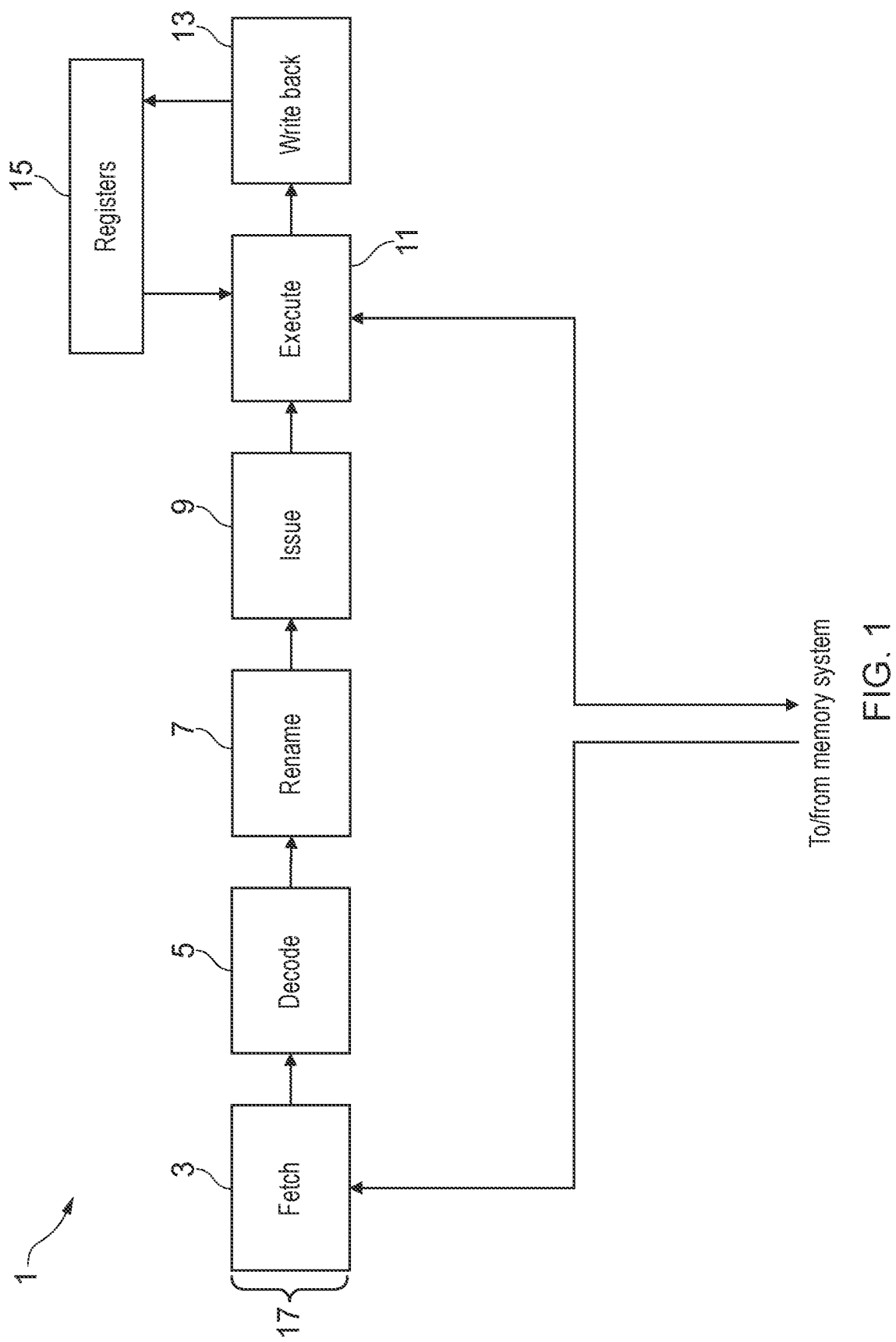
FIG. 1 illustrates an example of a processor pipeline.

Before discussing example implementations with reference to the accompanying figures, the following description of example implementations and associated advantages is provided.

There are several types of load value predictor. For example, one type of load value predictor may rely on the fact that a given load instruction may load the same data value each time it is executed. This means that a data value for a given load instruction can often be predicted based on a load value retrieved in response to a previous execution of the same instruction.

Another type of load value predictor may rely on the addresses of a sequence of load operations forming a regular sequence. For example, if a sequence of load operations is performed in which the address for each load operation differs from the previous address by the same amount (e.g. a linearly progressing sequence, such as 1, 4, 7, 10, . . . ), this type of load value predictor may be able to predict the entire sequence of data values before the corresponding load operations are executed.

However, neither of these approaches will necessarily work for a sequence of load operations for which the loaded data values form a temporal sequence. A temporal sequence comprises an arbitrary sequence of values which repeats periodically; for example, the following sequence of values is a temporal sequence with a periodicity of 4 (the dashes "-" indicate the periodicity):

9, 3, 12, 19-9, 3, 12, 19-9, 3, 12, 19

In the above sequence, the first values (9, 3, 12, 19) follow an arbitrary sequence, but this sequence repeats. This type of sequence may also be referred to as a "periodic" sequence.

Temporal sequences of loaded data values are fairly common in data processing. For example, pointer chasing algorithms such as traversal of a linked list (e.g. a list in which each entry contains a pointer to the next entry) may involve loading a temporal sequence of values. Hence, it would be useful to be able to predict such sequences.

A difficulty in predicting temporal sequences of load values like this is that the periodicity of the sequence may differ from the periodicity of any identifiers (e.g. the program counter, instance count, etc.) associated with the load instructions. This means that the same identifier is not always necessarily associated with the same load value. Moreover, as can be seen from the above example, the sequence may not be a linearly progressing sequence.

The present technique aims to provide a mechanism for predicting temporal sequences of load values. In particular, the present technique provides an apparatus comprising processing circuitry to execute load operations, each load operation being associated with an identifier indicative of a position of the load operation in a sequence of load operations. The identifier associated with each load operation could be any identifier which is indicative of the load operation's position in the sequence of load operations. For example, it could be a program counter, an instance count, or a loop identifier. Each load operation may be executed by the processing circuitry in response to a load instruction being decoded, for example.

The apparatus also includes prediction circuitry to receive a given load value indicative of a value read in response to execution of a given load operation and to make at least one prediction indicating a predicted load value for a subsequent load operation to be executed by the processing circuitry. The prediction made by the prediction circuitry is dependent on the given load value, and also indicates an ID-delta value, the ID-delta value being a difference between a given identifier associated with the given load operation, and an identifier of the subsequent load operation. Note that the predicted load value need not necessarily be the next load value in the sequence—the subsequent load operation could be several load operations ahead of the given load operation.

The prediction circuitry is configured to determine the predicted load value in dependence on at least one occurrence of each of the given load value and the predicted load value being observed during execution of a previously-executed sequence of load operations, and to determine the ID-delta value in dependence on a difference between identifiers associated with the at least one occurrence of each of the given load value and the predicted load value in the previously-executed sequence of load operations.

For example, consider a load value of "A" observed as the result of a load operation with identifier "1", and a load value of "B" observed as the result of a load operation with identifier "4". If the prediction circuitry later receives a given load value of "A", the prediction may indicate a predicted load value of "B" and an ID-delta value of "3".

In this way, by considering an "ID-delta" value indicative of the difference between identifiers, the prediction circuitry is able to perform load value prediction for a temporal sequence of load values. Moreover, because the prediction is dependent on an observed load value, this technique can be used regardless of whether the memory address for the subsequent load operation is known. This makes this technique particularly useful for self-feeding sequences such as pointer chasing algorithms, which often follow temporal sequence and in which the address for a given load operation is not typically known until the previous load operation has been executed.

In some examples, execution of the subsequent load operation comprises reading, from a location identified by a load address, a data value, and the predicted load value comprises at least one of:
 a predicted data value for the subsequent load operation, and
 a predicted load address for the subsequent load operation.

Hence, the "predicted load value" described above may refer to a data value or an address.

In some examples, the apparatus comprises metadata storage circuitry to store, for the previously-executed sequence of load operations, information indicative of a corresponding load value for each load operation in the previously-executed sequence of load operations, wherein the prediction circuitry is configured to generate the prediction in dependence on information read from the metadata storage circuitry.

In this way, the prediction is made in dependence on prediction data (e.g. the information stored in the metadata storage circuitry) corresponding to a previously-executed sequence of load operations. This can be particularly useful for predicting load values in a temporal sequence of load values, since a temporal sequence features a repeating pattern of load values (as explained above). This means that the previously-executed sequence could be part of the same sequence of load operations as the given load operation, in which case the pattern of load values seen in the previously-executed sequence may provide an indication of what subsequent load values in the sequence will be.

In some examples, the metadata storage circuitry comprises, for at least one trigger load operation in the previously-executed sequence of load operations, an entry to store, for at least one further load operation in the previously-executed sequence of load operations, a corresponding further load value, wherein the entry indicates, for the at least one further load operation, a corresponding ID-delta value indicating a difference between a trigger identifier associated with the trigger load operation and a corresponding identifier associated with the further load operation.

In this example, the at least one further load operation may comprise a later load operation in the previously-executed sequence. The entry may store the corresponding ID-delta value for each further load operation, or it may indicate the corresponding ID-delta value in some other way. For example, the entry may store the corresponding identifier, with the trigger identifier also being stored (e.g. in a trigger entry corresponding to the trigger load operation), making it possible for the ID-delta value to subsequently be calculated from these values. Alternatively, the trigger identifier could be stored as above, but the corresponding ID-delta value for the at least one further load operation could be implicit from an arrangement of the storage metadata circuitry (e.g. each entry in the metadata storage may be associated with a different ID-delta value). In any case, this arrangement of the metadata storage circuitry allows a temporal sequence of load values corresponding to a previously-executed sequence to be represented, such that a prediction can be made for subsequent load operations in the sequence.

In some examples, the associated identifier for each load operation comprises a loop identifier, the loop identifier being incremented for each backwards branch taken.

There are many different identifiers which could be used as the associated identifier for each load operation. For example, one might consider using the program counter (PC) for this purpose, or an instance count (e.g. indicating a number of times a particular load PC has been fetched). Alternatively, one could define a new identifier for this purpose. However, while any of these identifiers (or one of several other existing identifiers) could be used as the associated identifier, this example makes use of a loop identifier (also referred to as a loop ID) as the associated identifier. A loop identifier is incremented for each backwards branch taken during execution of a sequence of instructions. There are a number of advantages to using the loop identifier as the corresponding identifier. For example, the loop identifier is already used for other purposes in a typical processor (e.g. in a replay predictor), so using the loop identifier avoids the need to define a new identifier. Moreover, there may be situations where the loop identifier would be better than, for example, an instance count—for example, in a program that sometimes skips some of the load operations, the instance count would not be incremented for those skipped load operations, whereas the loop identifier would be incremented, because a backwards branch would still be taken. This helps to mitigate against any effect of skipped load operations on the accuracy of predictions made by the prediction circuitry. Note that, in some data processing systems, the replay predictor provides a number of candidate loop IDs, one of which is incremented for every backwards branch taken. In such data processing systems, where the present example is implemented, it is that loop ID (the one that is incremented for each backwards branch taken) that is used as the corresponding identifier.

In some examples, the apparatus comprises training circuitry responsive to execution of at least one observed load operation to store, in temporary storage circuitry, an observed load value indicative of a value read in response to execution of the observed load operation.

In this way, by training the prediction circuitry based on previously-observed load operations, more accurate predictions can be made for the given load operation and any further load operations. Note that the training circuitry may also be referred to as a "recorder".

In some examples, the training circuitry is responsive to the execution of the at least one observed load operation to store, in the temporary storage circuitry, an indication of an identifier associated with the observed load operation.

Storing an indication of the identifier in the temporary storage circuitry means that more storage space is needed in the temporary storage circuitry (or that the number of load operations which can be represented in the temporary storage circuitry is reduced). However, an advantage of storing an indication of the identifier (rather than, for example, having the identifier be implicit from the structure of the temporary storage structure) is that it can provide more freedom over how the temporary structure is arranged. The indication of the identifier stored in the temporary storage circuitry could be the identifier itself, a corresponding ID-delta value, or any other value which can be used to determine the identifier.

In some examples, the training circuitry is responsive to the execution of the at least one observed load operation to select a storage location in the temporary storage circuitry in dependence on an identifier associated with the observed load operation, and to store the observed load value in the selected storage location, and the training circuitry is configured to select the storage location to provide an indication of the identifier associated with the observed load operation.

In this example, the identifier is not explicitly stored in the temporary storage location, but is instead implicit from the position of the storage location used to store information associated with the observed load operation. As indicated above, this can place constraints on how the temporary storage circuitry is arranged, but also reduces the amount of storage space required for each observed load operation.

In some examples, the temporary storage structure is configured to hold a metadata line comprising a trigger entry to store information indicative of a trigger load operation, and one or more further entries to store, for each observed load operation, the observed load value. In these examples, the training circuitry is configured to store, in response to determining that a predetermined condition has been met, the metadata line to metadata storage circuitry, and the prediction circuitry is configured to generate the prediction in dependence on information read from the metadata storage circuitry.

This describes an example of how the metadata storage circuitry may be populated based on the results of observed load operations. Providing a trigger entry and one or more further entries allows a relationship between the observed load operations and the trigger load operation to be indicated, which can make it easier to retrieve prediction data from the metadata storage circuitry when a prediction is requested.

In some examples, the temporary storage structure is configured to hold a metadata line comprising a trigger entry to store information indicative of a trigger load operation, and one or more further entries to store, for each observed load operation, the observed load value. In these examples, the temporary storage circuitry comprises a trigger queue to hold a plurality of trigger entries, and a recorder array comprising, for a first trigger entry in the trigger queue, the one or more further entries, wherein the metadata line comprises the first trigger entry in the trigger queue and the one or more further entries in the recorder array.

There are many ways in which the metadata line could be implemented in the present technique. However, in this example, the metadata line is formed of an entry of a trigger queue and one or more entries in a recorder array. Providing a trigger queue separate from the recorder array increases the number of different triggers for which metadata lines can be generated and stored, which can simplify predictions.

In some examples, the training circuitry is responsive to execution of the at least one observed load operation to:
  determine whether there is an available entry in the trigger queue and, in response to determining that there is an available entry in the trigger queue, store information indicative of the at least one observed load operation to the available entry in the trigger queue; and
  store, to an available entry in the recorder array, the observed load value.

Hence, in this example of using a trigger queue and recorder array, it is possible to update both the trigger queue and the recorder array in response to observing a single observed load operation. Thus, the observed load operation can provide prediction information for use in multiple predictions—it can act as the trigger for one prediction (e.g. it can be used as an input into the prediction circuitry if it is observed in future, and used to lookup the metadata storage circuitry) and as a prediction for another trigger (e.g. it can form part of a subsequent prediction).

In some examples, the temporary storage structure is configured to hold a metadata line comprising a trigger entry to store information indicative of a trigger load operation, and one or more further entries to store, for each observed load operation, the observed load value. In these examples, the temporary storage structure comprises a rotating buffer comprising the trigger entry and the one or more further entries.

This describes another example of how the metadata line may be represented in the temporary storage circuitry. A rotating buffer can be a relatively space-efficient way of storing information associated with a sequence of load operations.

In some examples, the apparatus comprises metadata storage circuitry to store, for the previously-executed sequence of load operations, information indicative of a corresponding load value for each load operation in the previously-executed sequence of load operations, wherein the prediction circuitry is configured to generate the prediction in dependence on information read from the metadata storage circuitry. In these examples, the apparatus also comprises confidence tracking circuitry responsive to execution of the subsequent load operation to compare a subsequent load value read in response to execution of the subsequent load operation with the predicted load value, and to update a confidence value associated with the given load value in dependence on the comparison.

This example uses a form of confidence tracking, and provides a mechanism for recording the expected accuracy of a prediction. Accordingly, the confidence tracking circuitry of this example can be used to improve the accuracy of predictions that are output by the prediction circuitry. Note that the confidence value can take any of a number of forms. However, in some examples, the confidence value may be a count value that is incremented for each accurate prediction and decremented for each miss-prediction.

In some examples, the prediction circuitry is configured to suppress making the prediction until the confidence value associated with the given load value is determined to meet a predetermined condition.

This is an example of how the confidence tracking circuitry described above can be used to reduce the chance of a miss-prediction occurring. The predetermined condition could, in some particular examples, be a threshold confidence value that needs to be met (or exceeded) before the prediction circuitry makes the prediction. Note that once the predetermined condition has been met, the confidence tracking circuitry may continue to update the confidence value (e.g. in response to each prediction made in response to the given load value), or it may stop updating the confidence value once the condition is met, unless there is a miss-prediction.

In some examples, the apparatus comprises training circuitry responsive to execution of at least one observed load operation to store, in temporary storage circuitry, an observed load value indicative of a value read in response to execution of the observed load operation, and sampling circuitry responsive to execution of an observed sequence of load operations to determine whether the observed sequence comprises a self-feeding sequence of load operations, wherein the training circuitry is configured to suppress storing the observed load value and the indication of the link between the observed load operation and the at least one previous value unless the at least one observed load operation is determined, by the sampling circuitry, to be part of the self-feeding sequence.

A self-feeding sequence may be a sequence of load operations in which the load address for each load operation is determined, at least in part, in dependence on a result of a previous load operation in the sequence. For example, a pointer chasing sequence is one example of a self-feeding sequence, and involves accessing one memory location to obtain a pointer to a subsequent location, which in turn provides a pointer to a further location, and so on. An example of a pointer chase sequence may be the traversal of a linked list, since each entry in a linked list holds a pointer to the next entry in the list. A self-feeding sequence of load operations is more likely than non-self-feeding sequences to be a predictable pointer chase sequence, the load values of which are more likely to form a temporal sequence that can be predicted using the prediction circuitry of the present technique. Hence, by limiting training to self-feeding sequences recognised by the sampling circuitry, space in the metadata storage circuitry can be saved for storing prediction data that is more likely to be useful for future predictions.

There are different techniques for detecting self-feeding sequences. In some particular examples, the sampling circuitry may use data-flow graph analysis (e.g. this could be at the rename stage of a processor pipeline) to identify self-feeding loads.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular examples will now be described with reference to the figures.

FIG. 1 schematically illustrates an example of a data processing apparatus 1. The data processing apparatus has a processing pipeline 17 which includes a number of pipeline stages. In this example, the pipeline stages include a fetch stage 3 for fetching instructions from the memory system (e.g. this could be via an instruction cache); a decode stage 5 for decoding the fetched program instructions to generate micro-operations (decoded instructions) to be processed by remaining stages of the pipeline; an issue stage 9 for checking whether operands required for the micro-operations are available in a register file 15 (which is also referred to herein as the general register file, GRF) and issuing micro-operations for execution once the required operands for a given micro-operation are available; an execute stage 11 (also referred to herein as processing circuitry) for executing data processing operations corresponding to the micro-operations, by processing operands read from the register file 15 to generate result values; and a write back stage 13 for writing the results of the processing back to the register file 15. The pipeline 17 also includes a register renaming stage 7 for mapping architectural registers specified by program instructions or micro-operations to physical register specifiers identifying physical registers in the register file 15—this facilitates out of order processing using the data processing apparatus 1. It will be appreciated that this is merely one example of possible pipeline architecture, and other systems may have additional stages or a different configuration of stages. For example, an in-order processor may not include the register renaming stage 7.

The execute stage is an example of processing circuitry to execute load operations, each load operation being associated with an identifier indicative of a position of the load operation in a sequence of load operations. Each load operation may be executed in response to the decode stage 5 decoding a load instruction.

It will be appreciated that FIG. 1 is merely a simplified representation of some components of a possible processor pipeline architecture, and the processor may include many other elements not illustrated for conciseness, such as branch prediction mechanisms or address translation or memory management mechanisms.

Figure 2:
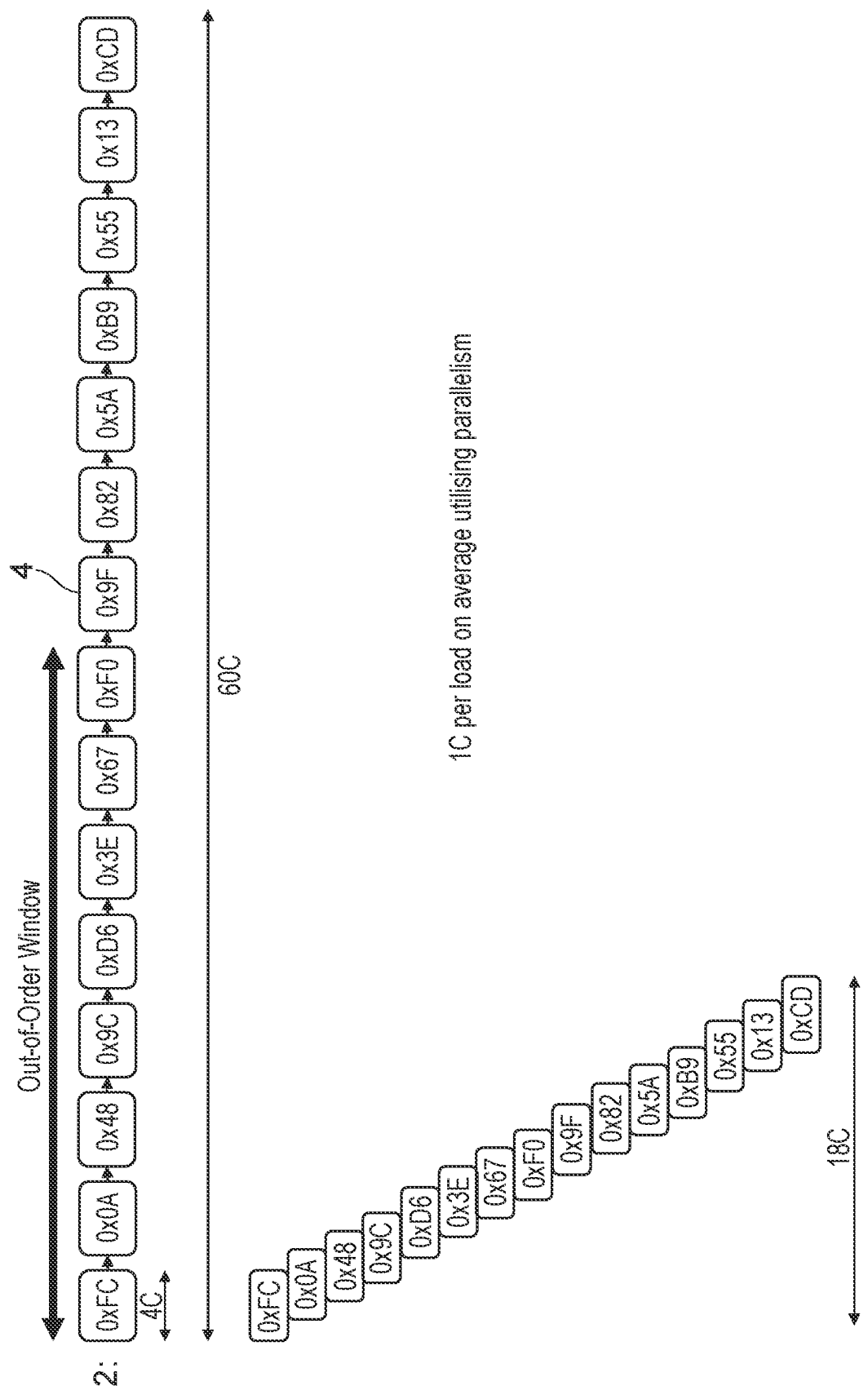
FIGS. 2 to 4 illustrate how overlapping execution can lead to improvements in performance.

FIG. 2 shows an example of a sequence 2 of fifteen (15) load operations, in which the data obtained from each load operation 4 is used to construct the address of the next load operation. For example, such a pattern of load operations (known as a self-feeding or self-producing sequence) could be seen in a pointer chasing sequence, where each load operation obtains a pointer for use in performing the next load operation. A particular example of a pointer-chasing algorithm is the traversal of a linked list, where each item in the list contains a pointer to the next item in the list. It will be appreciated that other examples of self-feeding sequences are also possible.

In the example of FIG. 2, each load operation takes four cycles (labelled "4C" in the Figure; 4C=4 cycles) to complete. Hence, when the load operations are performed in order, it takes a total of sixty cycles (60C) to complete all fifteen load operations.

Many data processing operations utilise parallelism (executing multiple instructions in parallel) to improve performance by reducing the total number of cycles needed to execute a sequence of instructions. Hence, FIG. 2 also demonstrates how overlapping execution of the load operation (e.g. utilising parallel execution) could, in theory, greatly reduce the number of cycles needed to execute the complete sequence. In particular, FIG. 2 shows a theoretical example where execution of each load operation 4 begins one cycle after execution of the preceding load operation, so that at any given time up to four load operations may be being executed at once. As a result of this arrangement, all fifteen operations are executed in eighteen cycles (18C). Based on the steady state load completion rate and assuming that FIG. 2 shows just a snippet of the temporal pattern, this gives an average per load latency that reaches the limit of 1 per cycle.

However, the overlapping of the load operations shown in FIG. 2 is only possible if the dependencies between the load operations allow it. There is a dependency between two load operations if the result of one operation is needed to perform the other load operation—if one load operation is dependent on another load operation, it typically cannot be executed until execution of the other operation has completed. Hence, the overlapping of load operations in FIG. 2 cannot work if (for example) any of the second, third or fourth load operations (each of which overlap with the first load operation) are dependent on the first load operation. Hence, it will be appreciated that this arrangement would not be suitable for a sequence such as a pointer chasing sequence, where each load operation is dependent on the preceding load operation.

Figure 3:
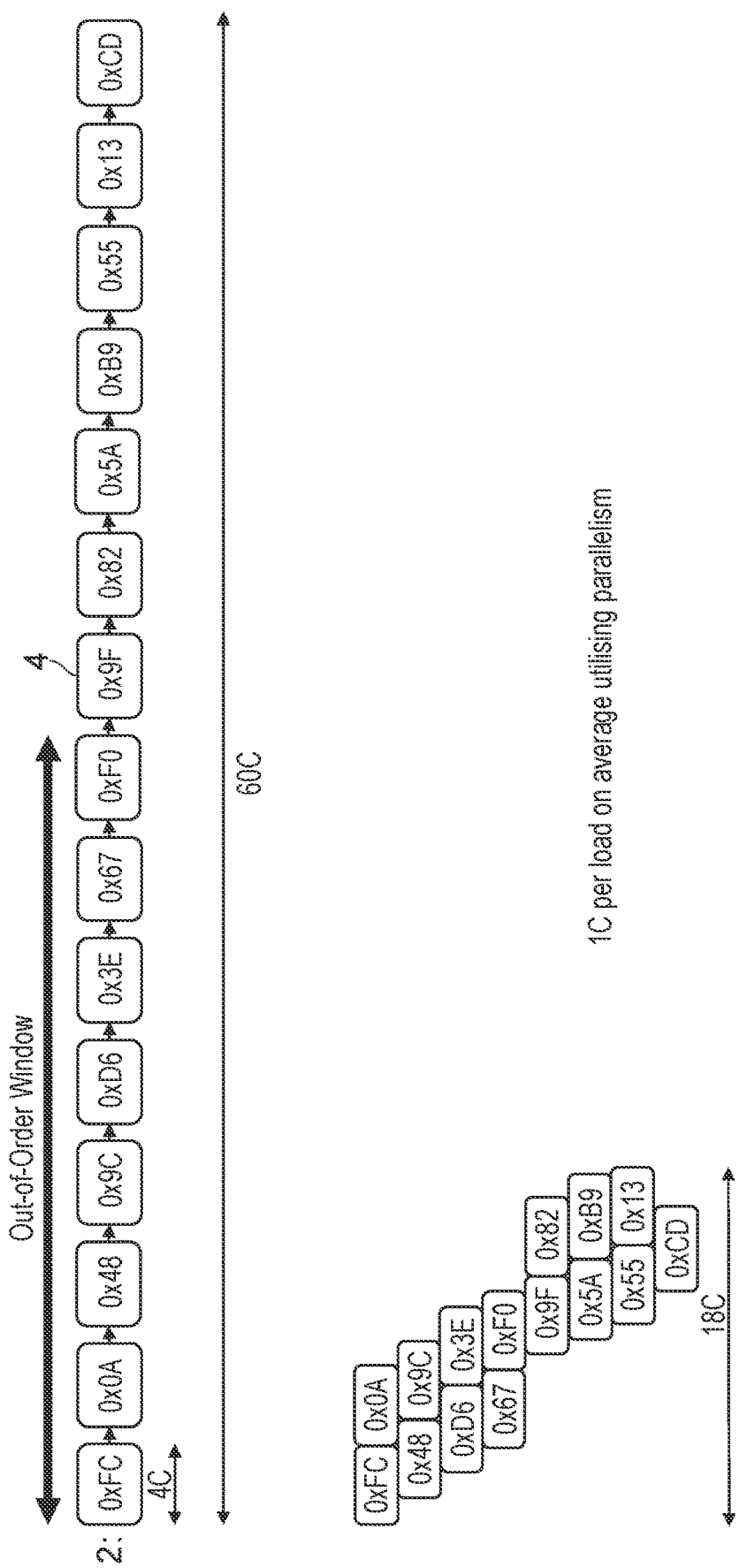
Figure 4:
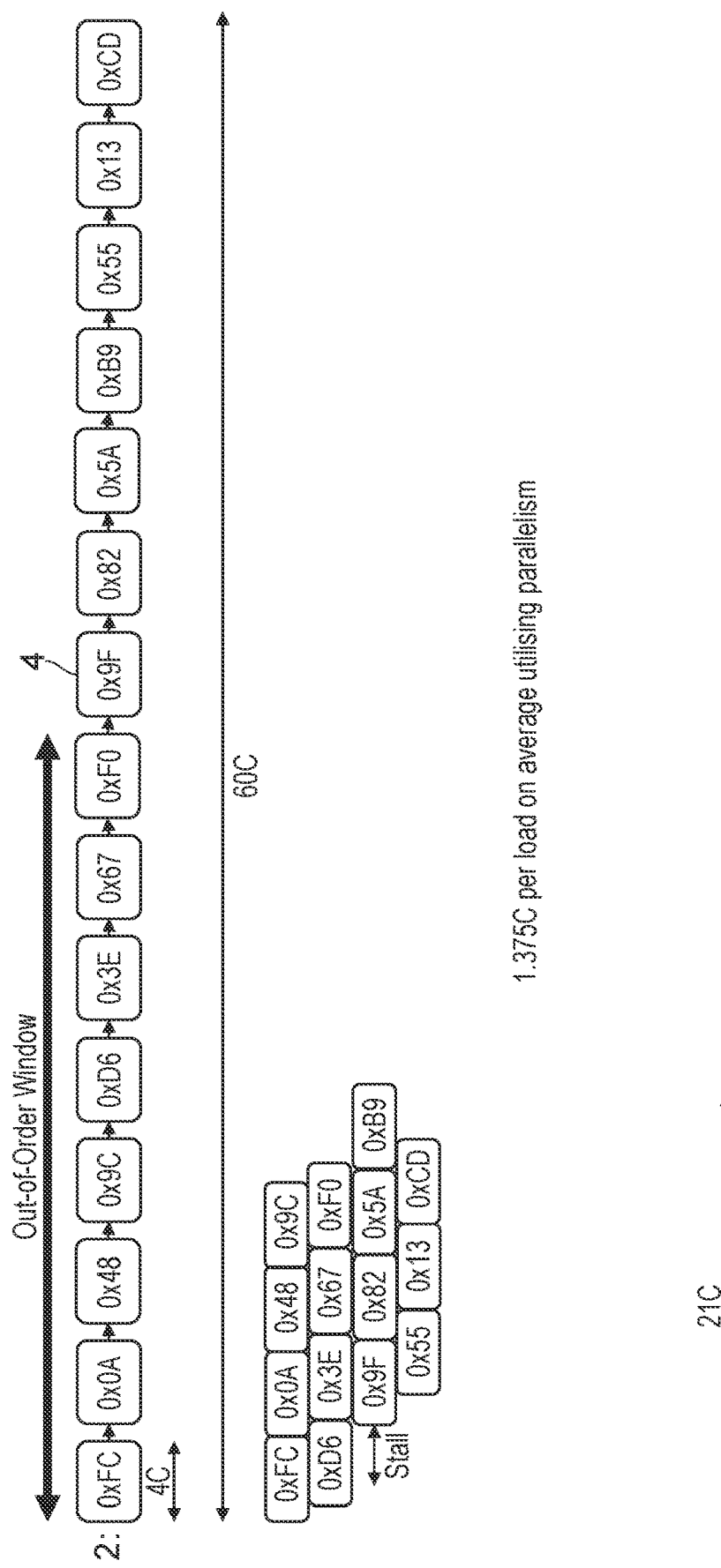

FIGS. 3 and 4 show further ways of overlapping the execution of the load operations; the arrangement in FIG. 3 allows all fifteen loads to be completed within eighteen cycles (18C), again averaging 1C per load. Meanwhile, the arrangement shown in FIG. 4 allows all fifteen loads to be completed in 21 cycles (note the 3-cycle stall every 8 loads (e.g. before execution of the "0x9F" load operation)), which gives an average of 1.375C per load. These examples do allow dependencies between some adjacent load operations, but still limit which loads can depend on which other loads. For example, in FIG. 3, the operation to load value 0x0A can be dependent on the operation to load value 0xFC, because the first load completes before the second load begins. However, the operations to load values 0x48, 0xD6 and 0x67 cannot depend on the load value 0xFC. Similarly, in FIG. 4, the operations to load values 0x0A, 0x48 and 0x9C can all be dependent on load value 0xFC, but the operation to load value 0xD6 cannot.

Thus, FIGS. 2 to 4 demonstrate the performance improvements which can be provided by parallel execution, provided that dependencies between the load operations in the sequence are limited. However, there are patterns of load operations—such as pointer chasing programs, which are seen relatively frequently—with patterns of dependencies which do not permit any of the patterns shown in FIGS. 2 to 4. For example, if the sequence 2 represents a linked list traversal, then no level of parallel execution will be possible unless the chain of dependencies can be broken.

Examples of the present technique aim to provide mechanisms for reducing the number of cycles needed to execute such a sequence of load operations, and hence to improve performance. In particular, examples of the present technique aim to use load value prediction to remove some or all of the dependencies in the sequence.

Load prediction techniques often rely on a given load operation being executed multiple times and retrieving the same value each time. Other techniques may rely on the sequence of load operations using a regular (e.g. linearly progressing) pattern of load addresses (e.g. each load value is at an address X bytes after the address of the previous load operation) or loading a regular pattern of data values. Such load prediction techniques can be useful in many situations, but they are not particularly useful when the sequence of load operations does not meet either of these requirements. For example, the load values (e.g. the data values read in response to the load operations, or the load addresses from which the data values are read) may follow a temporal sequence, which comprises a seemingly arbitrary sequence of values which repeats periodically. This is fairly common—for example (as explained above), pointer chasing sequences often result in temporal sequences of load values being observed. Similarly, some load value prediction techniques may not be particularly useful in situations where an identifier (such as a program counter, loop ID or instance count) associated with two instances of the same load operation varies—this is also fairly common, particularly when a sequence of load operations comprises fewer operations than the number of available identifiers.

Examples of the present technique seek to provide an alternative approach to load value prediction which can predict load values in temporal sequences such as these.

Figures 5, 6:
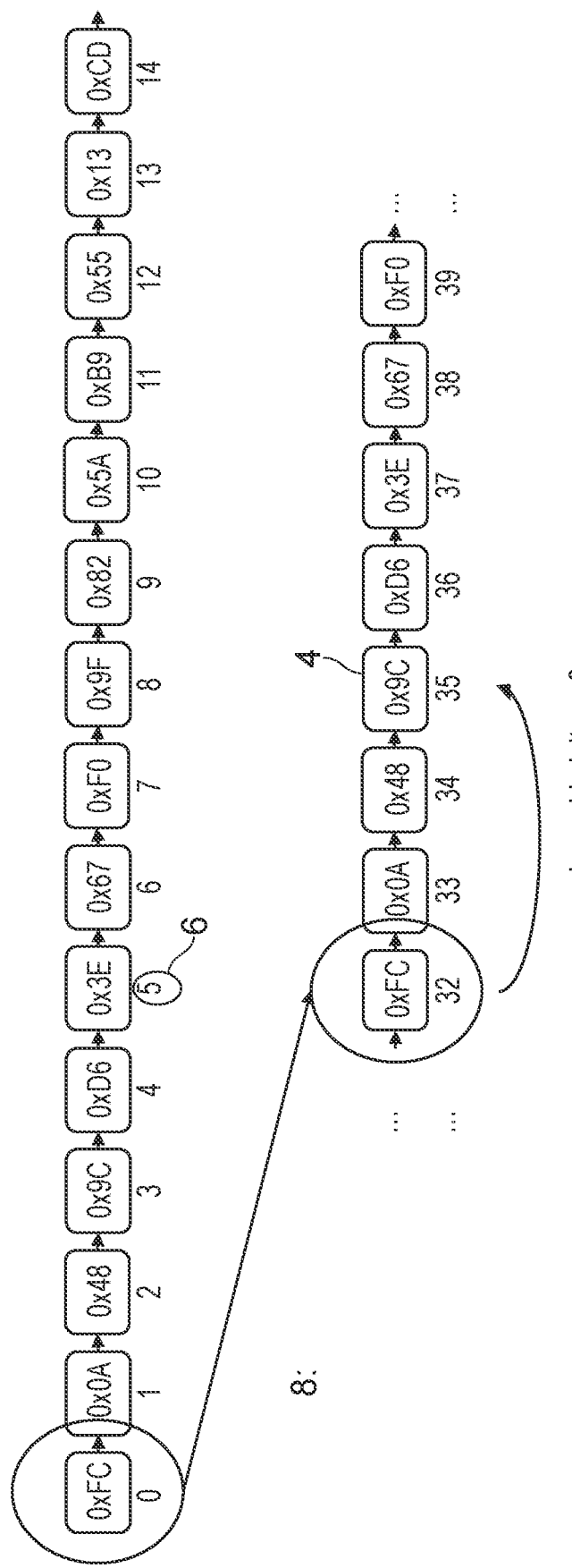
FIG. 5 illustrates an example of how load value prediction can be used to make predictions for a temporal sequence of loads.
FIG. 6 illustrates an example of prediction circuitry.

Referring to FIG. 5, each load operation 4 in the sequence 8 is associated with an identifier 6 (a loop ID in this example). The sequence 8 shown in FIG. 5 is an extended version of the sequence shown in the previous Figures. As the figure shows, the sequence 8 is a temporal sequence, in which a sequence of 32 load operations (the sequence beginning with 0xFC-0x0A-0x48-0x9C-0xD6- etc. . . . ) repeats itself.

However, while the load values repeat themselves every 32 operations, each instance of a given load value is associated with a different loop ID. For example, the second instance of load value 0xFC is associated with a loop ID of 32, whereas the first instance was associated with the loop ID 0. This happens because the periodicity of the temporal sequence (e.g. the number of load values in the sequence that is repeated—the periodicity of the sequence in FIG. 5 is 32, for example) is different from the number of loop IDs which are available (e.g. there are more than 32 available loop IDs). The loop ID of a given load operation does not, therefore, directly indicate what the load value will be.

However, the inventors of the present technique realised that, while the identifier itself may differ between different instances of the same load values, the difference between the identifiers of two load values will always be the same. For example, in the sequence 8 shown in FIG. 5, a load value of 0xFC (loop IDs 0 and 32) is repeatedly followed by a load value of 0x9C (Loop IDs 3 and 35) three loads later—in other words, the difference between the identifiers associated with load value 0xFC and 0x9C (referred to as a "loop ID delta" or an ID-delta value) remains constant at 3. This fact is relied upon to implement the prediction circuitry of examples of the present technique.

FIG. 6 shows an example of prediction circuitry 10 according to examples of the present technique—note that the prediction circuitry is also referred to herein as a "temporal value predictor", because it is particularly useful for predicting load values in temporal sequences.

As shown in FIG. 6, the prediction circuitry 10 takes, as inputs, a load value (e.g. a data value read in response to a load operation, or an address from which the data value was read) and a loop ID associated with that loop value. The prediction circuitry then outputs a prediction indicating a subsequent load value and a corresponding identifier (or a corresponding ID delta value indicating a difference between the identifier of the predicted load value and the identifier of the input load value). In the particular example demonstrated in FIG. 6, a load value of 0xFC and a loop ID of 32 are input. The prediction circuitry then predicts that a subsequent load with an ID delta value of 3 (and hence a loop ID of 32+3=35) will have a load value of 0x9C. As will be explained in more detail below, this prediction is based on the fact that at least one previous instance of the load value 0xFC (e.g. the load with loop ID 0) was followed, 3 load operations later, by a load value of 0x9C (e.g. the load with loop ID 3). The prediction circuitry 10 is thus able to predict, based on a loop ID delta value associated with the input load value, a subsequent load value in a temporal sequence of load values.

The prediction circuitry 10 is an example of prediction circuitry to receive a given load value indicative of a value read in response to execution of a given load operation, the given load operation being associated with a given identifier, wherein the prediction circuitry is configured to make, in dependence on the given load value, at least one prediction indicating a predicted load value for a subsequent load operation to be executed by the processing circuitry and an ID-delta value indicating a difference between the given identifier and an identifier of the subsequent load operation. The prediction circuitry 10 is also an example of prediction circuitry configured to determine the predicted load value in dependence on at least one occurrence of each of the given load value and the predicted load value being observed during execution of a previously-executed sequence of load operations, wherein the prediction circuitry is configured to determine the ID-delta value in dependence on a difference between identifiers associated with the at least one occurrence of each of the given load value and the predicted load value in the previously-executed sequence of load operations.

Figure 7:
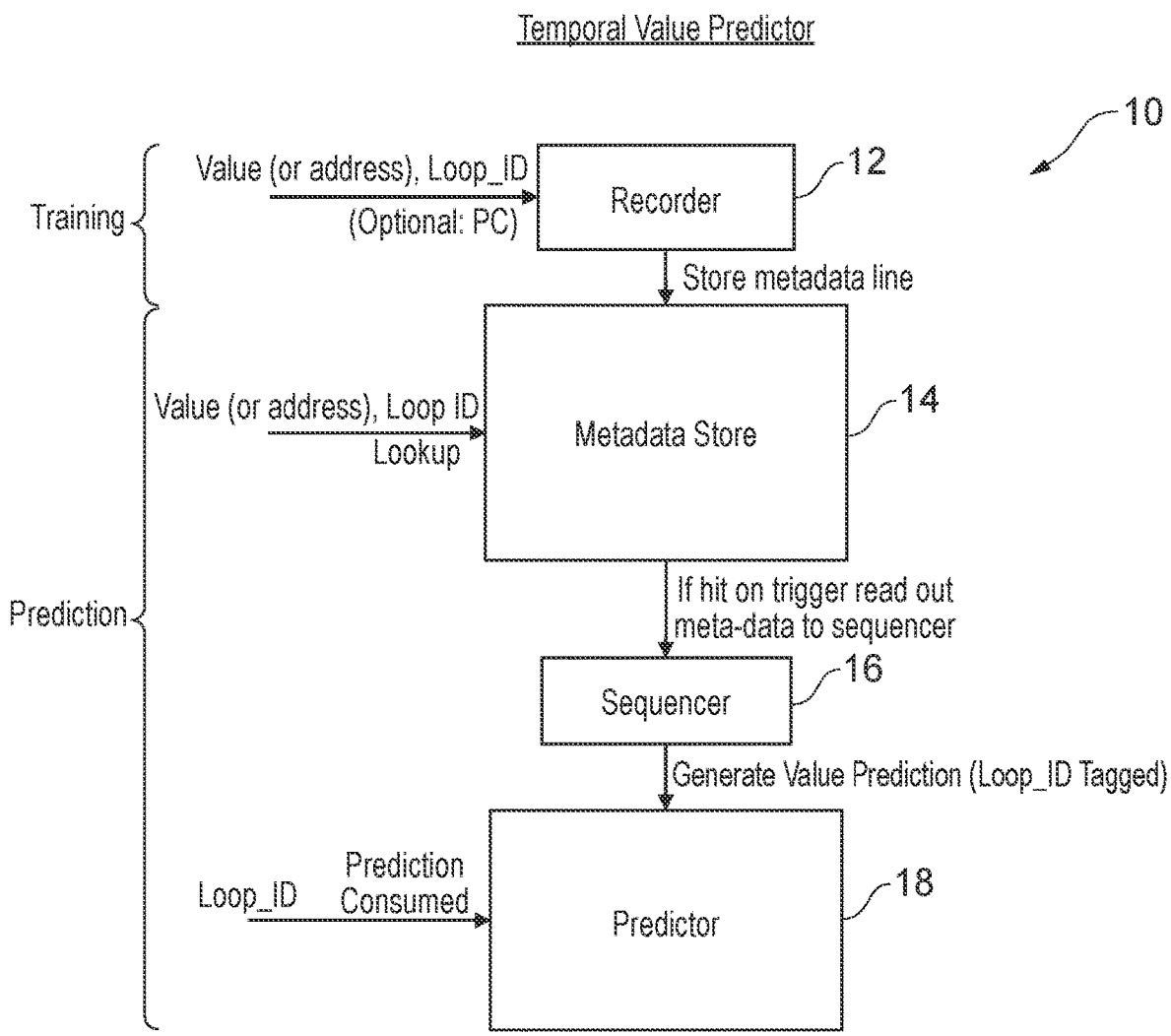
FIG. 7 illustrates a more detailed example of prediction circuitry.

FIG. 7 shows a more detailed view of the prediction circuitry 10. The prediction circuitry 10 comprises a recorder 12 (also referred to as training circuitry) to collect prediction data for use in generating predictions. The prediction data is stored to metadata storage circuitry 14 (also referred to as a metadata store). A sequencer 16 (also referred to as sequencer circuitry) is used to generate a prediction, which is consumed by a predictor 18. Each of these elements are described in more detail below.

Figure 8:
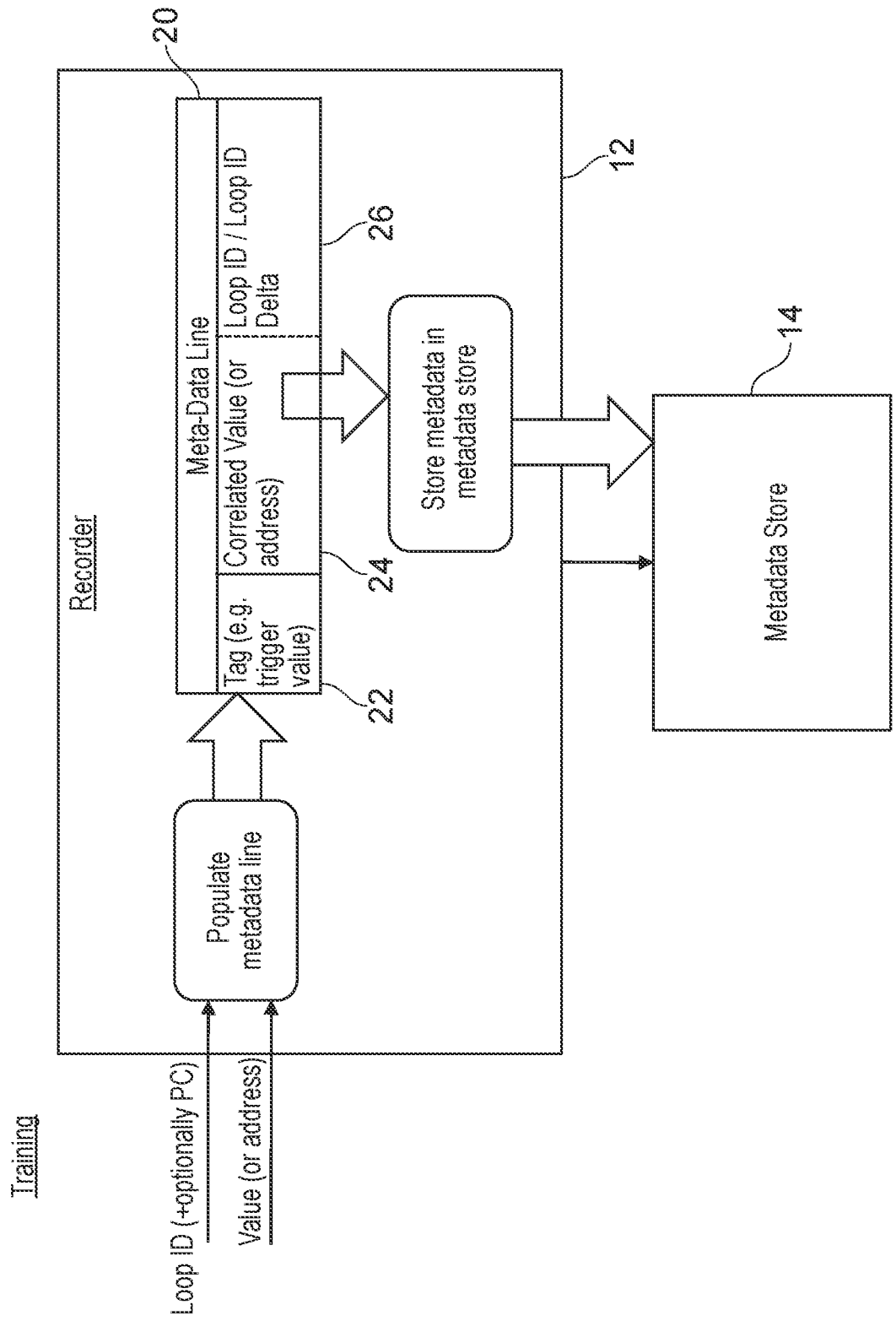
FIG. 8 illustrates an example of how prediction circuitry may be trained.

FIG. 8 shows the recorder (training circuitry) 12 in more detail. In particular, FIG. 8 illustrates how the prediction circuitry 10 can be "trained" based on an observed sequence of load operations to make predictions for subsequent operations in the sequence. As shown in the figure, the recorder 12 comprises temporary storage circuitry 20, which holds a metadata line. The metadata line comprises a tag or trigger value entry 22, which stores a previously observed load value. The tag entry may also store the identifier associated with the trigger load value. The metadata line also includes one of more entries 24 to store subsequent load values observed by the recorder 20. Finally, the metadata line comprises one or more entries 26 to store the identifiers (or ID-delta values) associated with the subsequent load values. If ID-delta values are stored, these are calculated relative to the identifier of the trigger load. Note that, in some alternative examples, the identifiers (or ID delta values) for the subsequent load values need not necessarily be stored—instead, the ID delta value for a particular load value could be implicit from its position in the metadata line.

The metadata line is populated, by the recorder 12, in response to load operations executed by processing circuitry. Once some condition is met (e.g. once the metadata line is full), the recorder 12 then stores the metadata line to the metadata store 14, and begins recording a new metadata line in the temporary storage circuitry 20.

Figure 9:
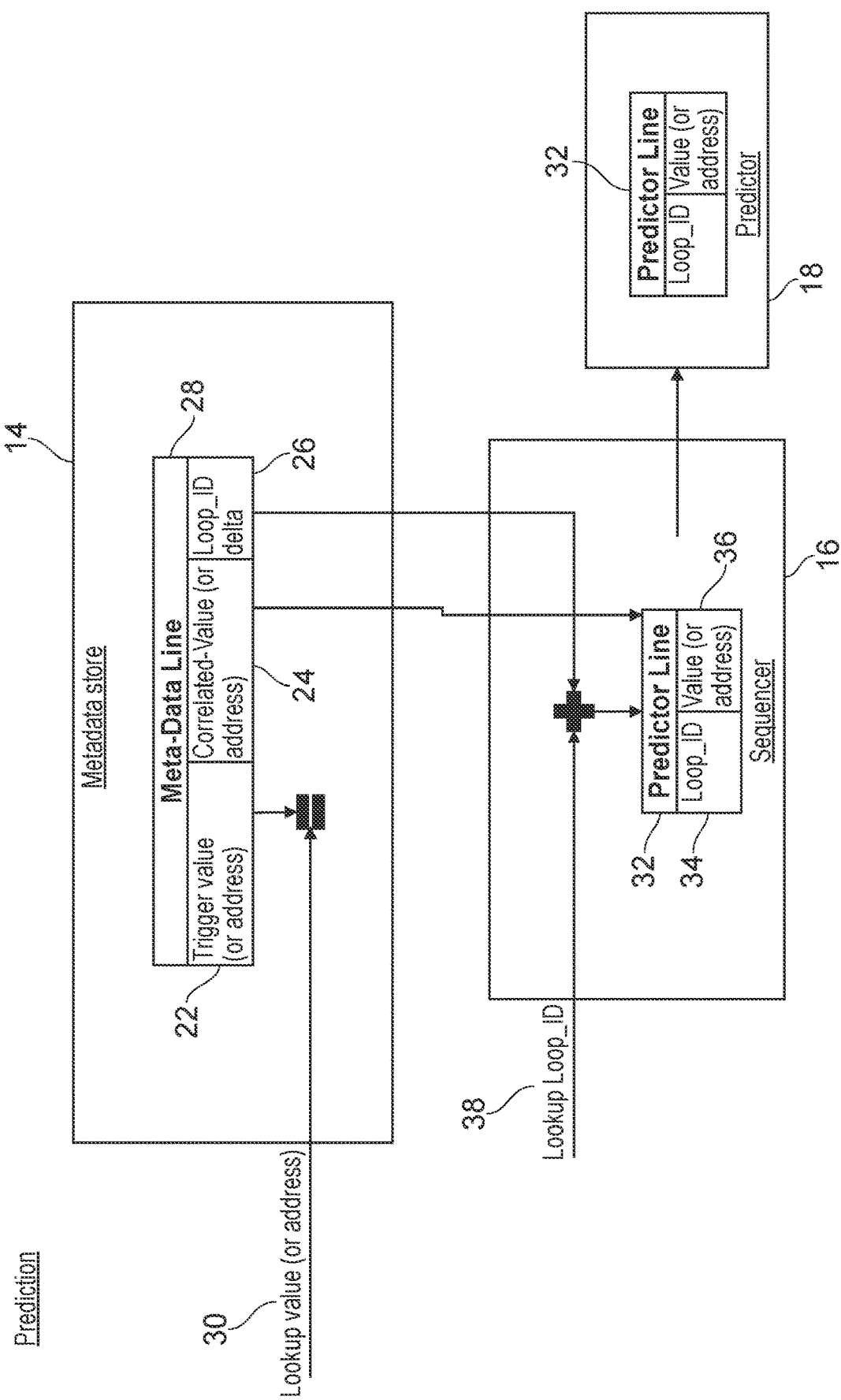
FIG. 9 illustrates an example of how prediction circuitry may be used to make a prediction.

FIG. 9 shows the metadata store 14, sequencer 16 and predictor 18 in more detail. In particular, FIG. 9 illustrates how the prediction circuitry 10 can be used to generate a prediction.

As mentioned above, metadata lines 28 populated by the recorder 12 are stored in the metadata store 14. For simplicity, FIG. 9 only shows one metadata line 28 in the metadata store; however, it will be appreciated that the metadata store 14 may hold data representing multiple metadata lines 28, each corresponding to a different tag/trigger value.

The prediction circuitry of the present technique receives a load value 30 and a corresponding loop ID 38 associated with a given (executed) load operation. The load value 30 is looked up in the metadata store 14; for example, the load value 30 may be compared with the tag/trigger value 22 in each metadata line 28 until a match is detected. If a match (also referred to as a "hit") is detected (e.g. if it is determined that the metadata store 14 holds a metadata line with a tag/trigger value 22 corresponding to the lookup value), the one or more subsequent load values 24 and the associated identifiers/ID delta values 26 are output to the sequencer 16. In this particular example, the metadata line 28 stores loop ID delta values.

In the sequencer 16, a predictor line 32 is created. The predictor line 32 indicates at least one identifier (a loop ID in this example) 34 and at least one corresponding load value 36. The at least one loop ID 34 is calculated, in this example, by adding the loop ID delta value(s) 26 read from the metadata line 28 to the loop ID 38 received by the prediction circuitry. The predictor line 32 is then provided to the predictor 18, which consumes (uses and/or outputs) the prediction. For example, the prediction may be consumed by loading the predicted load value(s) into registers accessible to the processing circuitry.

Figure 10:
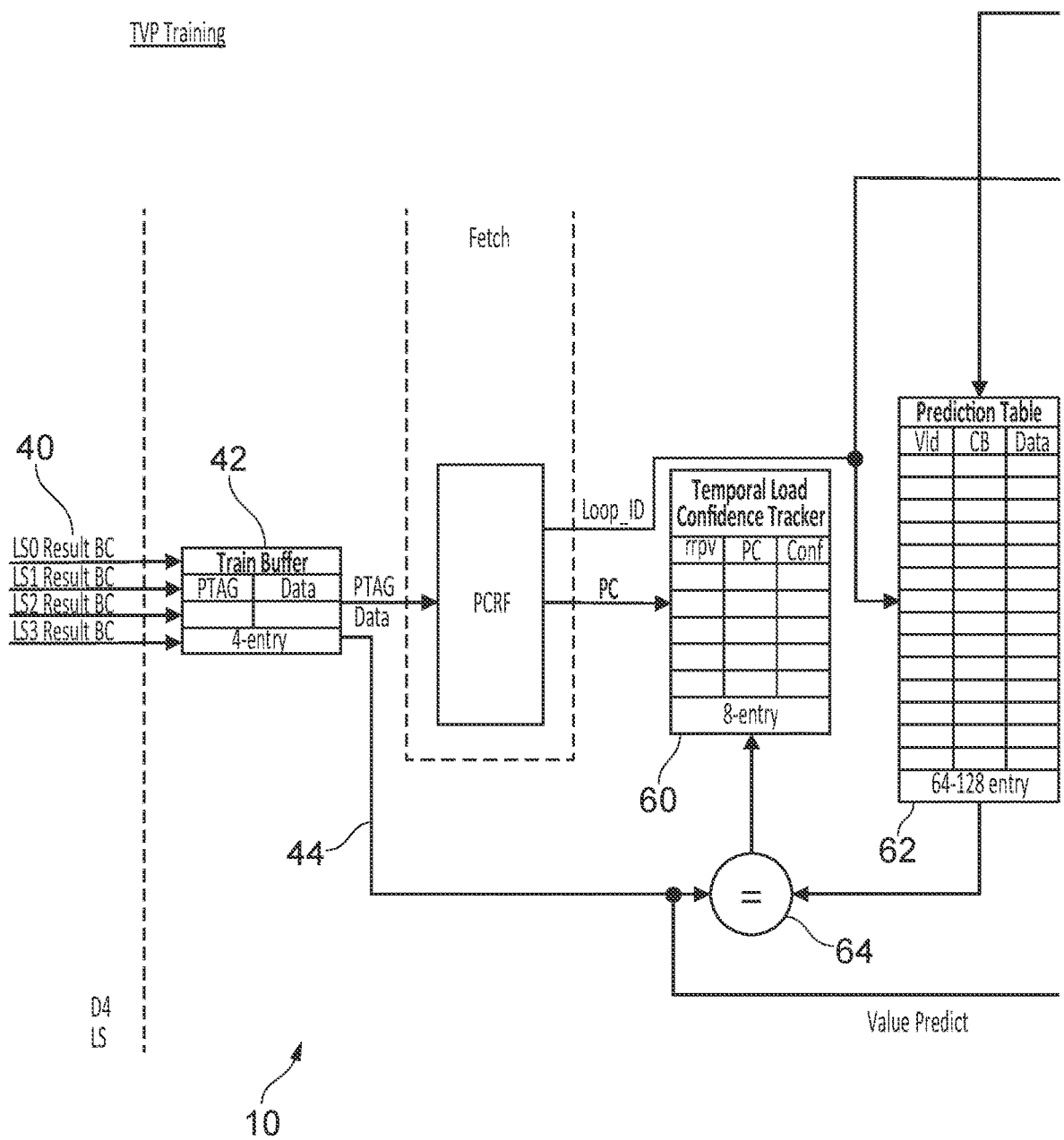
FIG. 10 illustrates a more detailed example of how prediction circuitry may be trained.
Figure 10:
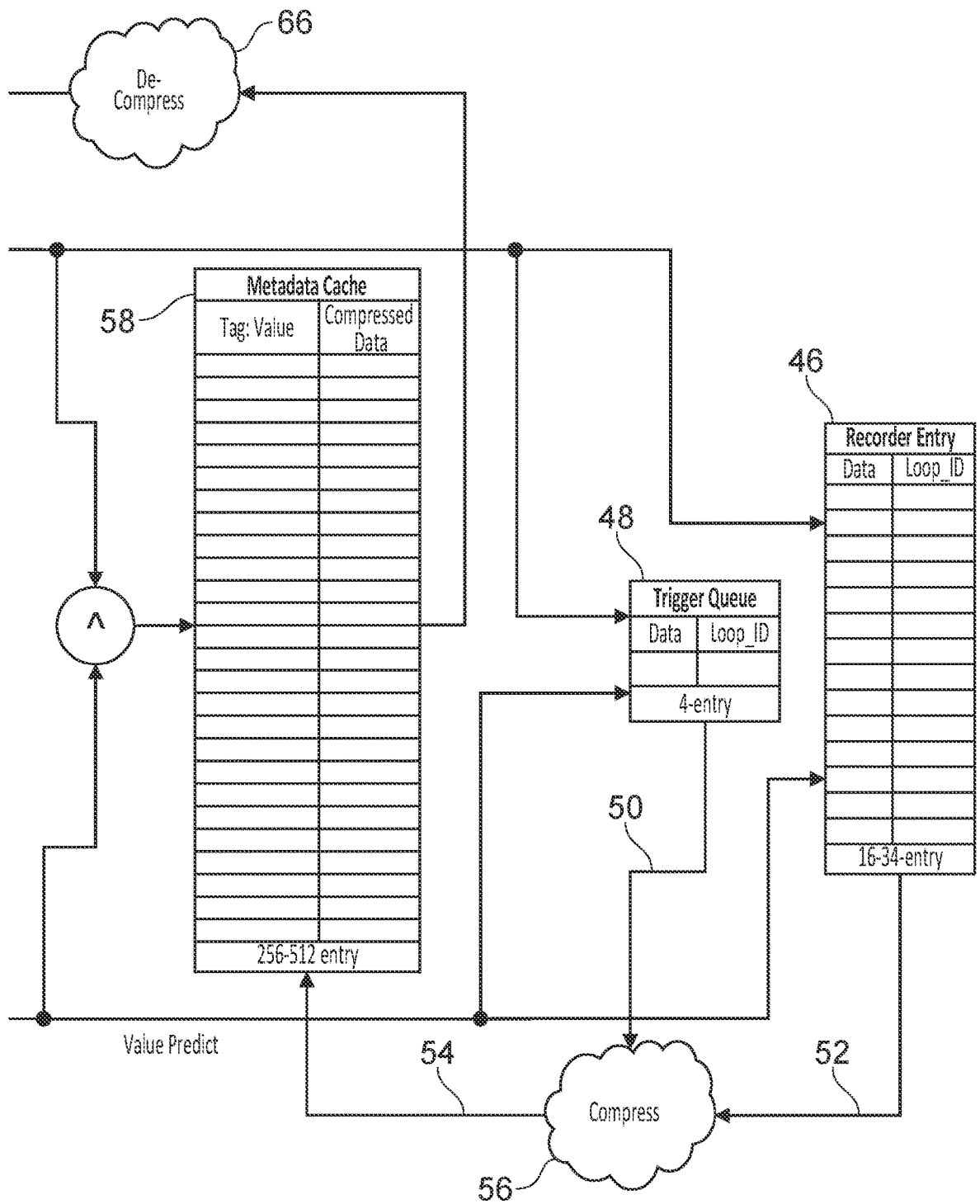

FIG. 10 shows an example of the prediction circuitry 10, demonstrating how the prediction circuitry 10 can be trained based on observed load operations.

In particular, FIG. 10 shows the results (e.g. load values) 40 of load operations being received and recorded in a train buffer 42. As shown by arrow 44, each load value and its associated loop ID is stored from the train buffer 42 to both the next available entry in the recorder array 46 and the next available entry (if there is one) in the trigger queue 48. The trigger queue 48 and the recorder array 46 together form an example of the temporary storage circuitry described above, while a single metadata line comprises the first entry of the trigger queue 48 in combination with the recorder array 46.

As shown by arrows 50, 52 and 54, a single metadata line is compressed 56 and stored in an entry of a metadata cache 58. This may take place once the recorder array 46 is full, or it may be triggered by some other condition being satisfied (e.g. the metadata line could be stored to the metadata cache 58 periodically, regardless of whether the recorder array 46 is all full). The metadata cache 58 is an example of metadata storage circuitry. Thus, the metadata storage circuitry is populated with prediction data as load operations are observed. Data from the metadata cache 58 can then, in response to an incoming load value matching one of the stored tag values, be decompressed 66 and stored in a prediction table 62, which may be found in the predictor 18 described above, and which is used to prepare a prediction. The prediction table 62 in this example stores, in each entry, a valid bit (Vld), a color bit (CB), and a data value (data). The data value is the predicted load value, the valid bit indicates whether the entry is valid, and the color bit is a tag value. Using a color bit as a tag instead of the loop ID allows us to have a prediction table that is smaller than the loop ID bits. The upper bits of the loop ID that don't form the prediction table index would instead form the tag, or color bits for the entry. It will be appreciated, however, that another form of tag could be used instead (e.g. the loop ID could be used).

In addition to populating the metadata cache 58, a confidence tracker 60 is also updated as load operations are observed. In particular, as each load operation completes, the PC Register File or Instruction Pointer Register File (PCRF) in the fetch stage is looked up to obtain the associated program counter (PC) value and loop ID. An entry in the confidence tracker 60 is then created (unless there is already an entry present for that load instruction), the entry indicating the program counter (PC) value and a confidence value. The confidence value indicates a confidence for the prediction. Subsequently, whenever a load instruction is executed, the observed load value from that operation is then used, not only to update the recorder and trigger queue, but also to update the confidence tracker 60. In particular, the observed load value is compared 64 with a predicted load value stored in a prediction table 62, and the confidence value is updated accordingly. For example, the confidence value may be incremented for a correct prediction, and decremented for an incorrect prediction. The confidence value can then be used to determine whether to output the prediction.

Figure 11:
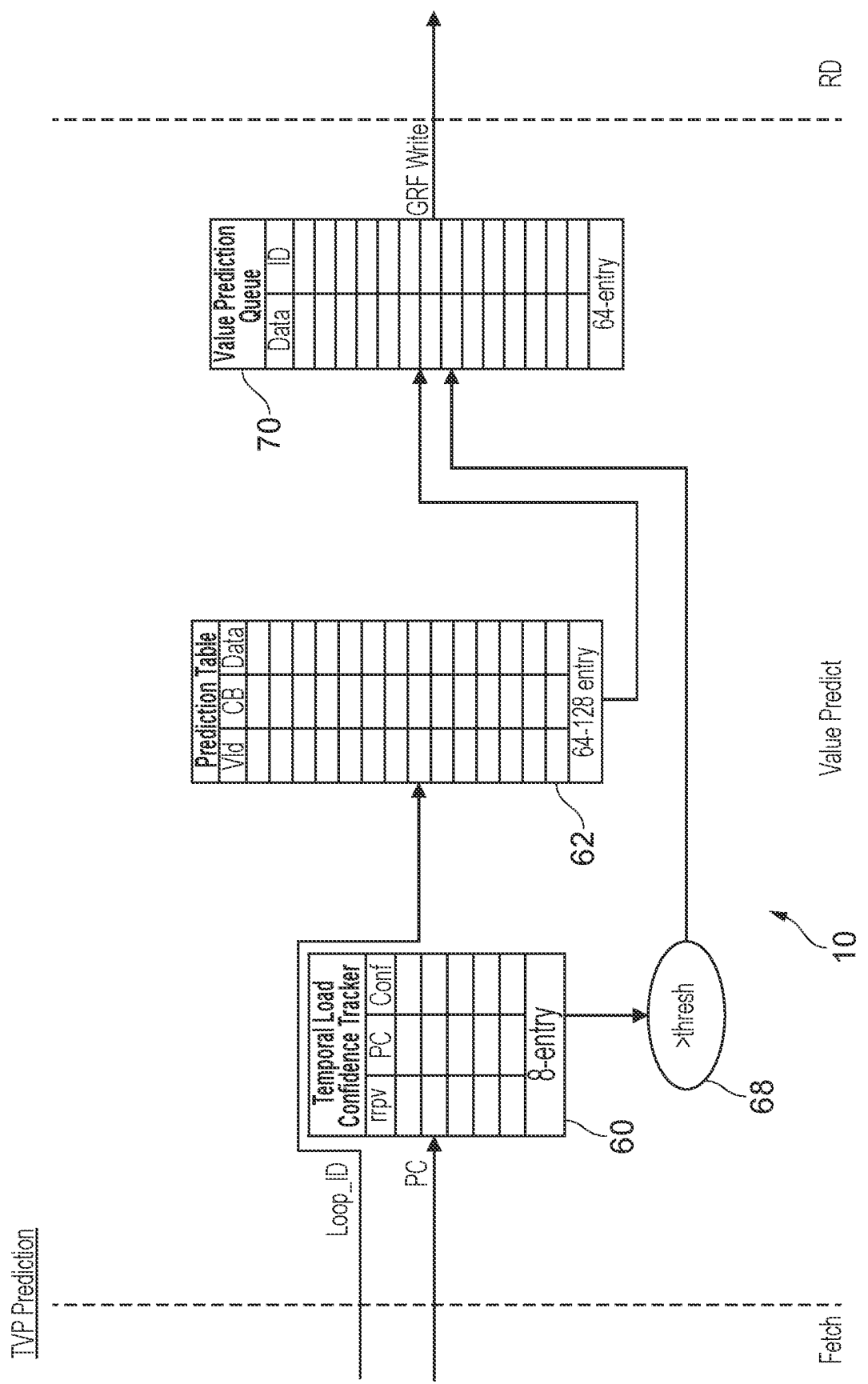
FIG. 11 illustrates a more detailed example of how prediction circuitry may be used to make a prediction.

FIG. 11 shows how the prediction circuitry 10 can be used to make a prediction, after the prediction table has been populated. As shown in the figure, the program counter (PC) for a fetched load instruction is used to lookup the confidence tracker 60, and if a hit is detected, the confidence value from the identified entry is compared 68 with a threshold to determine whether or not to output a prediction.

Meanwhile, the loop ID for the fetched load instruction is provided to the prediction table 62, so that a loop ID can be determined for each predicted load value, by adding the input loop ID to the ID delta value recorded for each predicted load value. The calculated loop IDs and the corresponding predicted load values are then stored in a value prediction queue 70. The prediction queue 70 thus holds a sequence of predicted load values and their corresponding loop IDs, which can be output. For example, the predicted load values could be written to the general register file (GRF) for use when the corresponding load operations are subsequently executed.

The value prediction queue 70 is optional. Because the prediction table 62 is looked up in the fetch stage, where a fetch block is 16 instructions wide, and then re-aligned or queued up in the decode stage, and spit out 10 instructions at a time, the value prediction queue can be useful as it provides a temporary location for the data to sit before the instruction is renamed. Once the instruction is renamed, the data can be written to the associated physical register (e.g. in the GRF). However, other approaches are also possible—for example, the loop ID could be tracked through to rename and, with the prediction table then being looked up again to obtain the data.

Figure 12:
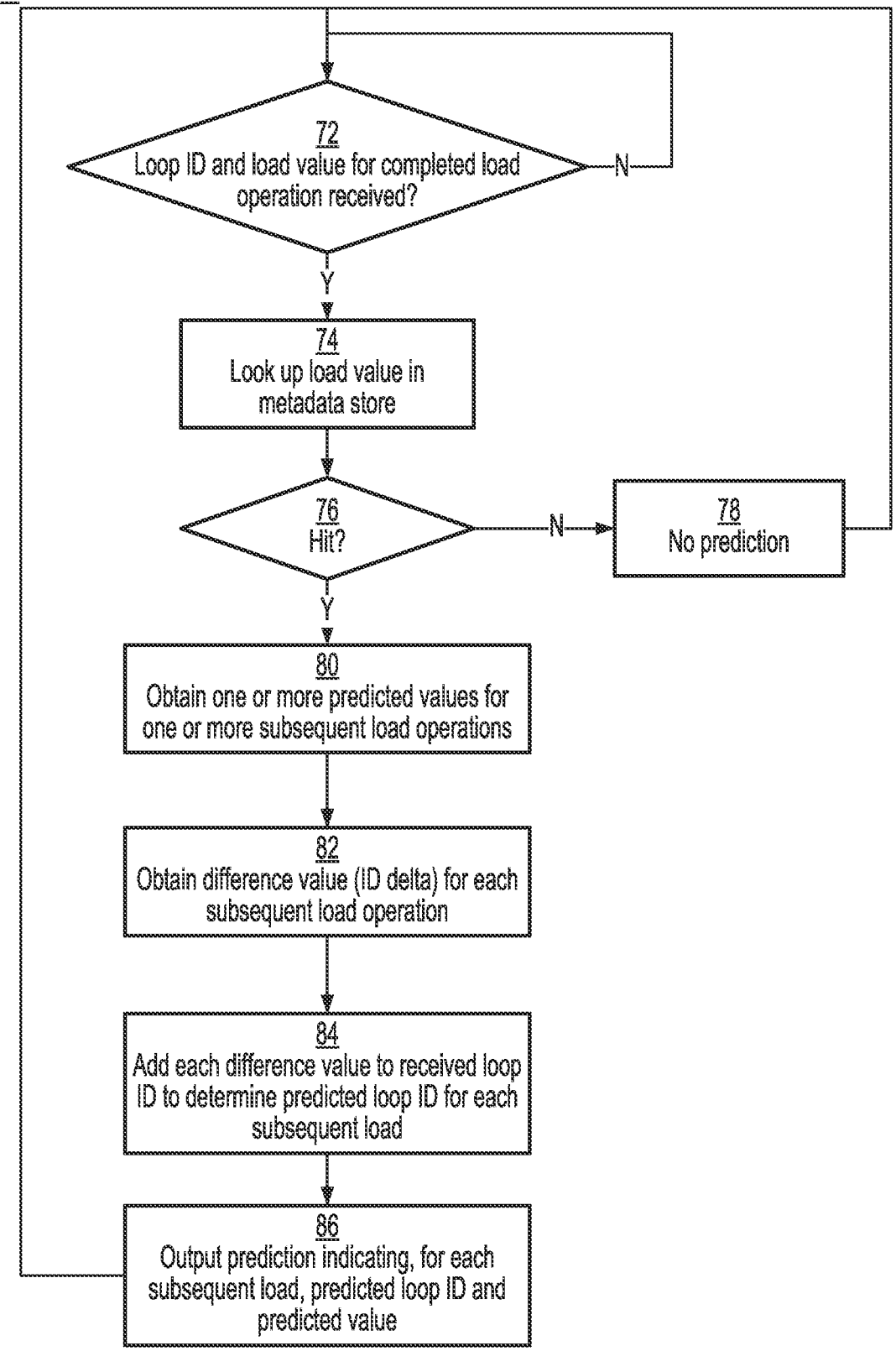
FIG. 12 is a flow diagram illustrating an example method of making a load value prediction.

FIG. 12 is a flow diagram illustrating an example of a method for generating a prediction using the prediction circuitry 10 of examples of the present technique. The method includes waiting 72 for a loop ID and associated load value for a completed load operation to be received. When the loop ID and load value are received, the method comprises looking up 74 the load value in the metadata store. It is determined 76 whether the lookup in the metadata store resulted in a hit and, if not, the method returns to waiting 72 for a loop ID and load value to be received, without 78 a prediction being output. On the other hand, if a hit is detected, one or more predicted load values are obtained 80 from the identified entry or entries of the metadata store. A difference value (ID delta) is also obtained 82 for the load operation corresponding with each predicted load value. A loop ID is then calculated 84 for each load operation represented by a predicted load value, the loop ID being calculated by adding the difference value for that load operation to the input loop ID. Once the prediction has been generated, it is output 86.

Figure 13:
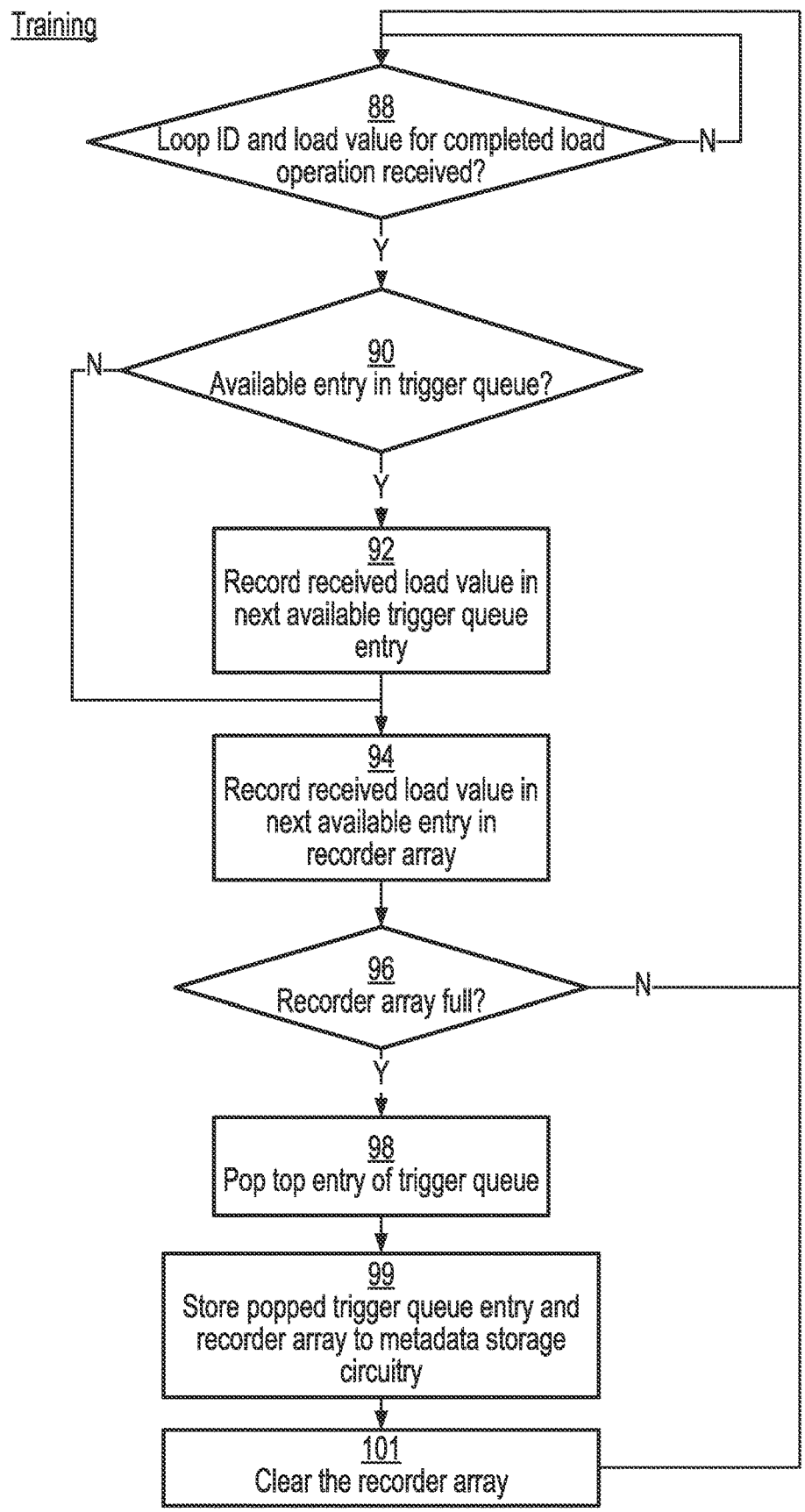
FIG. 13 is a flow diagram illustrating an example method of training prediction circuitry.

FIG. 13 is a flow diagram illustrating an example of a method for training prediction circuitry 10. The method comprises waiting 88 for a loop ID and load value from a completed load operation to be received. Once a loop ID and load value have been received, the method comprises determining 90 whether there is an available entry in the trigger queue and, if there is an available entry, recording 92 the received load value in the next available trigger queue entry. The method also includes, regardless of whether there was an available entry in the trigger queue, recording 94 the received load value in the next available entry in the recorder array. The method then comprises determining 96 whether the recorder array is now full and, if it is full, popping 98 the top entry of the trigger queue and storing 99, to metadata storage, a metadata line comprising the popped trigger queue entry and the contents of the recorder array. The recorder array is then cleared 101.

Figure 14:
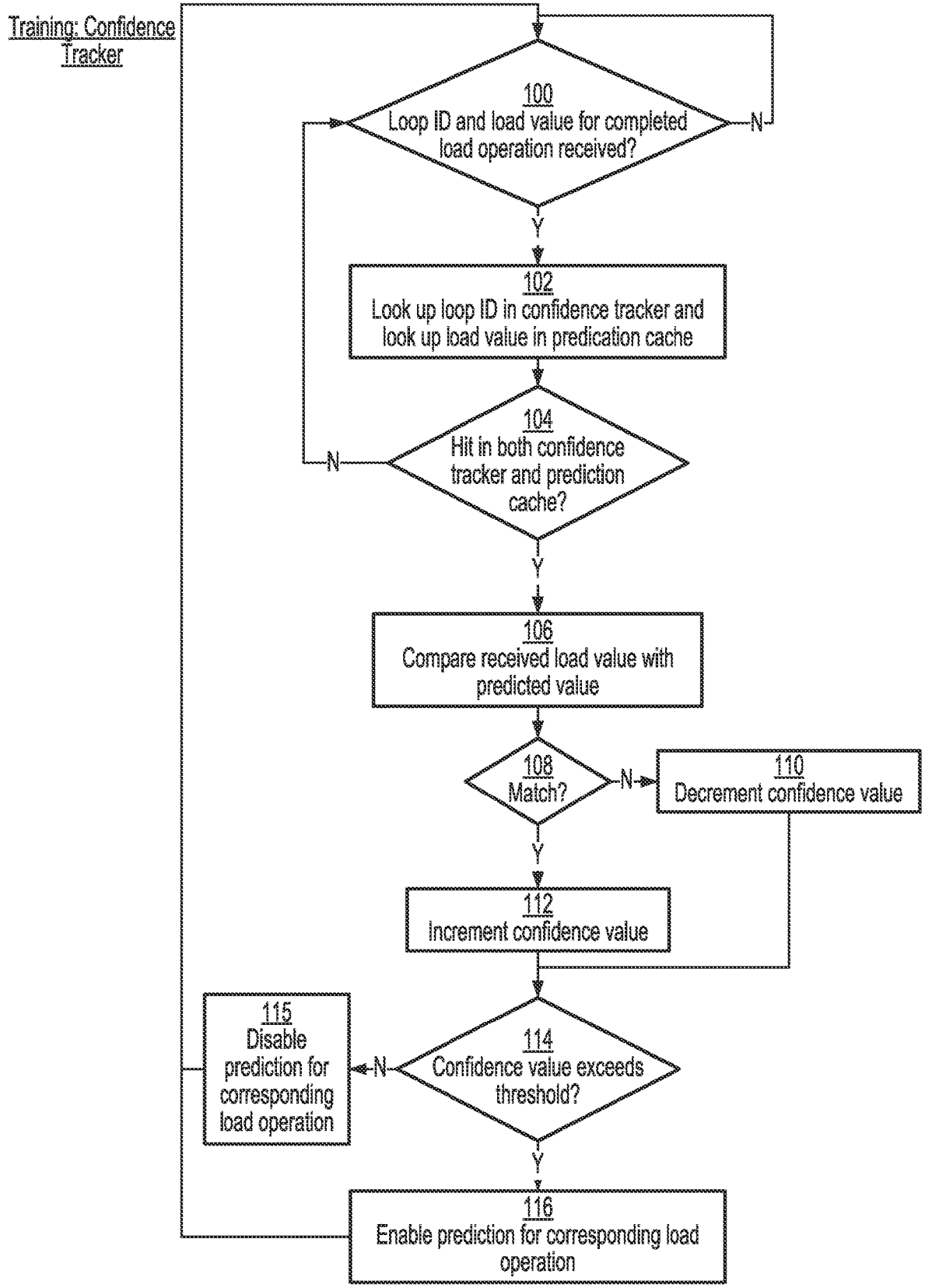
FIG. 14 is a flow diagram illustrating an example method of using a confidence tracker during training of prediction circuitry.

FIG. 14 is a flow diagram illustrating an example of a method of updating a confidence tracker when training the prediction circuitry 10 of examples of the present technique. The method comprises waiting 100 for a loop ID and load value from a completed load operation to be received. Once a loop ID and load value have been received, the method comprises a step 102 of looking up the loop ID in the confidence tracker and looking up the load value in the prediction cache (prediction table). It is then determined 104 whether both of these lookups resulted in a hit and, if they both resulted in a hit, the received load value is compared 106 with a predicted load value obtained from the prediction cache. It is then determined 108 whether the comparison results in a match. The confidence value is incremented 112 if the comparison resulted in a match (e.g. if the predicted load value is the same as the received load value), whereas the confidence value is decremented 110 if the comparison did not result in a match.

The method also comprises determining 114 whether the confidence value for the load operation corresponding with the received load value exceeds some predefined threshold. If it is determined that the threshold is exceeded, the method comprises enabling prediction for that load operation.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 15:
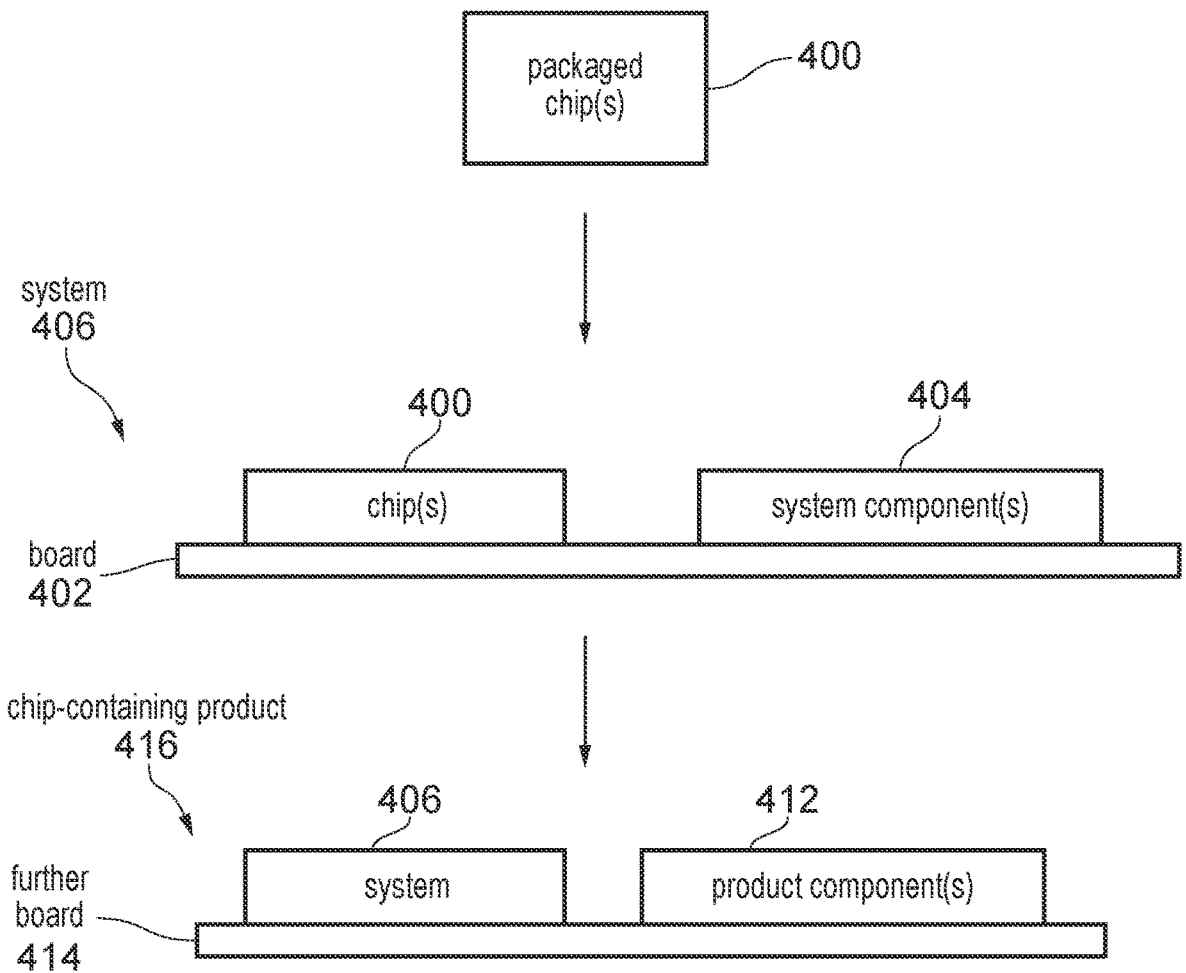
FIG. 15 illustrates an example of how the present technique could be implemented in a packaged chip, which could form part of a chip-containing product.

As shown in FIG. 15, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Further, the words "comprising at least one of . . ." in the present application are used to mean that any one of the following options or any combination of the following options is included. For example, "at least one of: A; B and C" is intended to mean A or B or C or any combination of A, B and C (e.g. A and B or A and C or B and C).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

Examples of the present technique include:

1. An apparatus comprising:

processing circuitry to execute load operations, each load operation being associated with an identifier indicative of a position of the load operation in a sequence of load operations; and prediction circuitry to receive a given load value indicative of a value read in response to execution of a given load operation, the given load operation being associated with a given identifier, wherein the prediction circuitry is configured to make, in dependence on the given load value, at least one prediction indicating a predicted load value for a subsequent load operation to be executed by the processing circuitry and an ID-delta value indicating a difference between the given identifier and an identifier of the subsequent load operation; and wherein the prediction circuitry is configured to determine the predicted load value in dependence on at least one occurrence of each of the given load value and the predicted load value being observed during execution of a previously-executed sequence of load operations; and wherein the prediction circuitry is configured to determine the ID-delta value in dependence on a difference between identifiers associated with the at least one occurrence of each of the given load value and the predicted load value in the previously-executed sequence of load operations.

2. The apparatus of clause 1, wherein:

execution of the subsequent load operation comprises reading, from a location identified by a load address, a data value; and the predicted load value comprises at least one of:
a predicted data value for the subsequent load operation, and
a predicted load address for the subsequent load operation.

3. The apparatus of any preceding clause, comprising metadata storage circuitry to store, for the previously-executed sequence of load operations, information indicative of a corresponding load value for each load operation in the previously-executed sequence of load operations, wherein the prediction circuitry is configured to generate the prediction in dependence on information read from the metadata storage circuitry.

4. The apparatus of clause 3, wherein the metadata storage circuitry comprises, for at least one trigger load operation in the previously-executed sequence of load operations, an entry to store, for at least one further load operation in the previously-executed sequence of load operations, a corresponding further load value, wherein the entry indicates, for the at least one further load operation, a corresponding ID-delta value indicating a difference between a trigger identifier associated with the trigger load operation and a corresponding identifier associated with the further load operation.

5. The apparatus of any preceding clause, wherein the associated identifier for each load operation comprises a loop identifier, the loop identifier being incremented for each backwards branch taken.

6. The apparatus of any preceding clause, comprising training circuitry responsive to execution of at least one observed load operation to store, in temporary storage circuitry, an observed load value indicative of a value read in response to execution of the observed load operation.

7. The apparatus of clause 6, wherein the training circuitry is responsive to the execution of the at least one observed load operation to store, in the temporary storage circuitry, an indication of an identifier associated with the observed load operation.

8. The apparatus of clause 6, wherein the training circuitry is responsive to the execution of the at least one observed load operation to select a storage location in the temporary storage circuitry in dependence on an identifier associated with the observed load operation, and to store the observed load value in the selected storage location; and the training circuitry is configured to select the storage location to provide an indication of the identifier associated with the observed load operation.

9. The apparatus of any of clauses 6 to 8, wherein:

the temporary storage structure is configured to hold a metadata line comprising:
a trigger entry to store information indicative of a trigger load operation; and
one or more further entries to store, for each observed load operation, the observed load value;

the training circuitry is configured to store, in response to determining that a predetermined condition has been met, the metadata line to metadata storage circuitry; and the prediction circuitry is configured to generate the prediction in dependence on information read from the metadata storage circuitry.

10. The apparatus of any of clauses 6 to 9, wherein the temporary storage structure is configured to hold a metadata line comprising:
a trigger entry to store information indicative of a trigger load operation; and
one or more further entries to store, for each observed load operation, the observed load value;

the temporary storage circuitry comprises:
a trigger queue to hold a plurality of trigger entries; and
a recorder array comprising, for a first trigger entry in the trigger queue, the one or more further entries, wherein the metadata line comprises the first trigger entry in the trigger queue and the one or more further entries in the recorder array.

11. The apparatus of clause 10, wherein:

the training circuitry is responsive to execution of the at least one observed load operation to:
determine whether there is an available entry in the trigger queue and, in response to determining that there is an available entry in the trigger queue, store information indicative of the at least one observed load operation to the available entry in the trigger queue; and
store, to an available entry in the recorder array, the observed load value.

12. The apparatus of any of clauses 6 to 9, wherein:

the temporary storage structure is configured to hold a metadata line comprising:
a trigger entry to store information indicative of a trigger load operation; and
one or more further entries to store, for each observed load operation, the observed load value; and the temporary storage structure comprises a rotating buffer comprising the trigger entry and the one or more further entries.

13. The apparatus of any preceding clause, comprising:

metadata storage circuitry to store, for the previously-executed sequence of load operations, information indicative of a corresponding load value for each load operation in the previously-executed sequence of load operations, wherein the prediction circuitry is configured to generate the prediction in dependence on information read from the metadata storage circuitry; and confidence tracking circuitry responsive to execution of the subsequent load operation to compare a subsequent load value read in response to execution of the subsequent load operation with the predicted load value, and to update a confidence value associated with the given load value in dependence on the comparison.

14. The apparatus of clause 13, wherein
the prediction circuitry is configured to suppress making the prediction until the confidence value associated with the given load value is determined to meet a predetermined condition.

15. The apparatus of any preceding clause, comprising:
training circuitry responsive to execution of at least one observed load operation to store, in temporary storage circuitry, an observed load value indicative of a value read in response to execution of the observed load operation; and
sampling circuitry responsive to execution of an observed sequence of load operations to determine whether the observed sequence comprises a self-feeding sequence of load operations,
wherein the training circuitry is configured to suppress storing the observed load value and the indication of the link between the observed load operation and the at least one previous value unless the at least one observed load operation is determined, by the sampling circuitry, to be part of the self-feeding sequence.

16. A system comprising:
the apparatus of any preceding clause, implemented in at least one packaged chip;
at least one system component; and
a board,
wherein the at least one packaged chip and the at least one system component are assembled on the board.

17. A chip-containing product comprising the system of clause 16 assembled on a further board with at least one other product component.

18. A method comprising:
executing load operations, each load operation being associated with an identifier indicative of a position of the load operation in a sequence of load operations;
receiving a given load value indicative of a value read in response to execution of a given load operation, the given load operation being associated with a given identifier,
making, in dependence on the given load value, at least one prediction indicating a predicted load value for a subsequent load operation to be executed and an ID-delta value indicating a difference between the given identifier and an identifier of the subsequent load operation;
determining the predicted load value in dependence on at least one occurrence of each of the given load value and the predicted load value being observed during execution of a previously-executed sequence of load operations; and
determining the ID-delta value in dependence on a difference between identifiers associated with the at least one occurrence of each of the given load value and the predicted load value in the previously-executed sequence of load operations.

19. A computer program comprising instructions which, when executed by a computer, cause the computer to perform the method of clause 18.

20. A computer program comprising computer-readable code for fabrication of an apparatus comprising:
processing circuitry to execute load operations, each load operation being associated with an identifier indicative of a position of the load operation in a sequence of load operations; and
prediction circuitry to receive a given load value indicative of a value read in response to execution of a given load operation, the given load operation being associated with a given identifier,
wherein the prediction circuitry is configured to make, in dependence on the given load value, at least one prediction indicating a predicted load value for a subsequent load operation to be executed by the processing circuitry and an ID-delta value indicating a difference between the given identifier and an identifier of the subsequent load operation; and
wherein the prediction circuitry is configured to determine the predicted load value in dependence on at least one occurrence of each of the given load value and the predicted load value being observed during execution of a previously-executed sequence of load operations; and
wherein the prediction circuitry is configured to determine the ID-delta value in dependence on a difference between identifiers associated with the at least one occurrence of each of the given load value and the predicted load value in the previously-executed sequence of load operations.

We claim:
1. An apparatus comprising:
processing circuitry to execute load operations, each load operation being associated with an identifier indicative of a position of the load operation in a sequence of load operations; and
prediction circuitry to receive a given load value indicative of a value read in response to execution of a given load operation, the given load operation being associated with a given identifier,
wherein the prediction circuitry is configured to make, in dependence on the given load value, at least one prediction indicating a predicted load value for a subsequent load operation to be executed by the processing circuitry and an ID-delta value indicating a difference between the given identifier and an identifier of the subsequent load operation; and
wherein the prediction circuitry is configured to determine the predicted load value in dependence on at least one occurrence of each of the given load value and the predicted load value being observed during execution of a previously-executed sequence of load operations; and
wherein the prediction circuitry is configured to determine the ID-delta value in dependence on a difference between identifiers associated with the at least one occurrence of each of the given load value and the predicted load value in the previously-executed sequence of load operations.

2. The apparatus of claim 1, wherein:
execution of the subsequent load operation comprises reading, from a location identified by a load address, a data value; and
the predicted load value comprises at least one of:
a predicted data value for the subsequent load operation, and
a predicted load address for the subsequent load operation.

3. The apparatus of claim 1, comprising
metadata storage circuitry to store, for the previously-executed sequence of load operations, information indicative of a corresponding load value for each load operation in the previously-executed sequence of load operations, wherein the prediction circuitry is configured to generate the prediction in dependence on information read from the metadata storage circuitry.

4. The apparatus of claim 3, wherein
the metadata storage circuitry comprises, for at least one trigger load operation in the previously-executed sequence of load operations, an entry to store, for at least one further load operation in the previously-executed sequence of load operations, a corresponding further load value, wherein the entry indicates, for the at least one further load operation, a corresponding ID-delta value indicating a difference between a trigger identifier associated with the trigger load operation and a corresponding identifier associated with the further load operation.

5. The apparatus of claim 1, wherein
the associated identifier for each load operation comprises a loop identifier, the loop identifier being incremented for each backwards branch taken.

6. The apparatus of claim 1, comprising
training circuitry responsive to execution of at least one observed load operation to store, in temporary storage circuitry, an observed load value indicative of a value read in response to execution of the observed load operation.

7. The apparatus of claim 6, wherein
the training circuitry is responsive to the execution of the at least one observed load operation to store, in the temporary storage circuitry, an indication of an identifier associated with the observed load operation.

8. The apparatus of claim 6, wherein
the training circuitry is responsive to the execution of the at least one observed load operation to select a storage location in the temporary storage circuitry in dependence on an identifier associated with the observed load operation, and to store the observed load value in the selected storage location; and
the training circuitry is configured to select the storage location to provide an indication of the identifier associated with the observed load operation.

9. The apparatus of claim 6, wherein:
the temporary storage structure is configured to hold a metadata line comprising:
  a trigger entry to store information indicative of a trigger load operation; and
  one or more further entries to store, for each observed load operation, the observed load value;
the training circuitry is configured to store, in response to determining that a predetermined condition has been met, the metadata line to metadata storage circuitry; and
the prediction circuitry is configured to generate the prediction in dependence on information read from the metadata storage circuitry.

10. The apparatus of claim 6, wherein
the temporary storage structure is configured to hold a metadata line comprising:
  a trigger entry to store information indicative of a trigger load operation; and
  one or more further entries to store, for each observed load operation, the observed load value;
the temporary storage circuitry comprises:
  a trigger queue to hold a plurality of trigger entries; and
  a recorder array comprising, for a first trigger entry in the trigger queue, the one or more further entries,
wherein the metadata line comprises the first trigger entry in the trigger queue and the one or more further entries in the recorder array.

11. The apparatus of claim 10, wherein:
the training circuitry is responsive to execution of the at least one observed load operation to:
  determine whether there is an available entry in the trigger queue and, in response to determining that there is an available entry in the trigger queue, store information indicative of the at least one observed load operation to the available entry in the trigger queue; and
  store, to an available entry in the recorder array, the observed load value.

12. The apparatus of claim 6, wherein:
the temporary storage structure is configured to hold a metadata line comprising:
  a trigger entry to store information indicative of a trigger load operation; and
  one or more further entries to store, for each observed load operation, the observed load value; and
the temporary storage structure comprises a rotating buffer comprising the trigger entry and the one or more further entries.

13. The apparatus of claim 1, comprising:
metadata storage circuitry to store, for the previously-executed sequence of load operations, information indicative of a corresponding load value for each load operation in the previously-executed sequence of load operations, wherein the prediction circuitry is configured to generate the prediction in dependence on information read from the metadata storage circuitry; and
confidence tracking circuitry responsive to execution of the subsequent load operation to compare a subsequent load value read in response to execution of the subsequent load operation with the predicted load value, and to update a confidence value associated with the given load value in dependence on the comparison.

14. The apparatus of claim 13, wherein
the prediction circuitry is configured to suppress making the prediction until the confidence value associated with the given load value is determined to meet a predetermined condition.

15. The apparatus of claim 1, comprising:
training circuitry responsive to execution of at least one observed load operation to store, in temporary storage circuitry, an observed load value indicative of a value read in response to execution of the observed load operation; and
sampling circuitry responsive to execution of an observed sequence of load operations to determine whether the observed sequence comprises a self-feeding sequence of load operations,
wherein the training circuitry is configured to suppress storing the observed load value and the indication of the link between the observed load operation and the at least one previous value unless the at least one observed load operation is determined, by the sampling circuitry, to be part of the self-feeding sequence.

16. A system comprising:
the apparatus of claim 1, implemented in at least one packaged chip;
at least one system component; and
a board,
wherein the at least one packaged chip and the at least one system component are assembled on the board.

17. A chip-containing product comprising the system of claim 16 assembled on a further board with at least one other product component.

18. A method comprising:
executing load operations, each load operation being associated with an identifier indicative of a position of the load operation in a sequence of load operations;
receiving a given load value indicative of a value read in response to execution of a given load operation, the given load operation being associated with a given identifier;
making, in dependence on the given load value, at least one prediction indicating a predicted load value for a subsequent load operation to be executed and an ID-delta value indicating a difference between the given identifier and an identifier of the subsequent load operation;
determining the predicted load value in dependence on at least one occurrence of each of the given load value and the predicted load value being observed during execution of a previously-executed sequence of load operations; and
determining the ID-delta value in dependence on a difference between identifiers associated with the at least one occurrence of each of the given load value and the predicted load value in the previously-executed sequence of load operations.

19. A non-transitory computer-readable storage medium to store a computer program comprising instructions which, when executed by a computer, cause the computer to perform the method of claim 18.

20. A non-transitory computer-readable storage medium to store computer-readable code for fabrication of an apparatus comprising:
processing circuitry to execute load operations, each load operation being associated with an identifier indicative of a position of the load operation in a sequence of load operations; and
prediction circuitry to receive a given load value indicative of a value read in response to execution of a given load operation, the given load operation being associated with a given identifier,
wherein the prediction circuitry is configured to make, in dependence on the given load value, at least one prediction indicating a predicted load value for a subsequent load operation to be executed by the processing circuitry and an ID-delta value indicating a difference between the given identifier and an identifier of the subsequent load operation; and
wherein the prediction circuitry is configured to determine the predicted load value in dependence on at least one occurrence of each of the given load value and the predicted load value being observed during execution of a previously-executed sequence of load operations; and
wherein the prediction circuitry is configured to determine the ID-delta value in dependence on a difference between identifiers associated with the at least one occurrence of each of the given load value and the predicted load value in the previously-executed sequence of load operations.

* * * * *